United States Patent
Endo et al.

(12) 
(10) Patent No.: US 6,344,508 B1
(45) Date of Patent: Feb. 5, 2002

(54) RECLAIMED PET RESIN COMPOSITION, MOLDED ARTICLE THEREOF, AND FLAME-RETARDANT RESIN COMPOSITION AND MOLDED ARTICLE THEREOF

(75) Inventors: Shunichi Endo, Ina-machi; Genichiro Ochiai, Toride; Yoshinobu Mizutani, Yokkaichi; Takuya Miho, Yamaguchi; Koichi Okumura, matsudo, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/600,565

(22) PCT Filed: Nov. 18, 1999

(86) PCT No.: PCT/JP99/06452

§ 371 Date: Sep. 14, 2000

§ 102(e) Date: Sep. 14, 2000

(87) PCT Pub. No.: WO00/31184

PCT Pub. Date: Jun. 2, 2000

(30) Foreign Application Priority Data

| Nov. 20, 1998 | (JP) | ............................................ | 10-330385 |
| Mar. 11, 1999 | (JP) | ............................................ | 11-064820 |
| Mar. 12, 1999 | (JP) | ............................................ | 11-066055 |
| Mar. 12, 1999 | (JP) | ............................................ | 11-066093 |
| Mar. 12, 1999 | (JP) | ............................................ | 11-066096 |

(51) Int. Cl.$^7$ ................................................. C08K 5/02
(52) U.S. Cl. ........................ 524/313; 524/464; 524/315; 524/539; 525/437
(58) Field of Search ................................ 524/313, 464, 524/539; 525/437

(56) References Cited

U.S. PATENT DOCUMENTS

| 5,712,336 A | 1/1998 | Gareiss et al. |
| 5,786,408 A | * 7/1998 | Kuroda et al. .............. 523/124 |

* cited by examiner

*Primary Examiner*—Kriellion A. Sanders
(74) *Attorney, Agent, or Firm*—Morgan & Finnegan, L.L.P.

(57) ABSTRACT

In the present invention, the No. I invention relates to a regenerated PET resin composition which comprises formulating 0.5–100 part by weight of a lactone polymer (B) with 100 parts by weight of a regenerated PET resin (A), in which there is improved a molding processability such as an injection moldability and extruding molding, and relates to a molded article therefrom and, the No. II invention relates to a flame retardant resin composition containing a thermoplastic resin (E) and a flame retardant (F), in which bleeding of the flame retardant is suppressed without a decline of a flame retardancy, and relates to a molded article therefrom.

33 Claims, No Drawings

RECLAIMED PET RESIN COMPOSITION, MOLDED ARTICLE THEREOF, AND FLAME-RETARDANT RESIN COMPOSITION AND MOLDED ARTICLE THEREOF

TECHNICAL FIELD

No. I invention in the present invention relates to a regeneration of a PET, and it relates to a regenerated PET resin composition in which there is improved a molding processability such as an injection moldability and extrusion processability, and a molded article therefrom. Further, No. II invention in the present invention relates to a thermoplastic resin composition containing a flame retardant and a molded article therefrom, in more detail, it relates to a flame retardant resin composition in which bleeding of the flame retardant is suppressed without a decline of flame retardancy, and a molded article therefrom.

BACKGROUND TECHNOLOGY

Thermoplastic resins are produced in a large amount because those are light and tough, excellent in water resistance, chemical resistance, and an electric insulation property, and easy in molding and processing. Particularly, a polyethylene terephthalate which is usually called a PET is mass-produced as bottles for beverages because it is light and tough and, further, excellent in transparency. Recently in Japan, Recycling Law for Vessels and Wrapping materials is enforced, and there is proceeded a measure of a shift to a recycling society in relation to plastics. Further, recycling of PET bottles is desired because of a worldwide trend.

However, since the regenerated PET resin includes a problem of a poor moldability, it is difficult to obtain a molded article by an injection molding method which is usually employed for general-purpose resins such as a polyolefin resin. For that reason, there is limited a use of the regenerated PET, and regeneration of PET is not progressed. Further, since the regenerated PET resin is a crushed resin from recollected bottles for beverages, textiles, and films, etc., it is usually unsettled in shapes and a flake-state, whereby, it is bulky and worse in transport efficiency.

Accordingly, it is desired that the regenerated PET resin is pellet-state in consideration of transport efficiency.

However, since moldability is poor, it is difficult to prepare uniform pellets. It is an existing circumstance that there are not methods by which there can be solved the above-described various problems in the regenerated PET resin.

The No. I invention in the present invention aims to provide a regenerated PET resin composition in which there is improved a molding processability such as an injection moldability and extrusion moldability, and to provide a molded article therefrom.

Further, since thermoplastic resins are light and tough, excellent in water resistance, chemical resistance, and an electric insulation property, and easy in molding and processing, those are employed in a wide range such as construction materials, materials for electric equipments, parts for cars, internally decorative materials for cars, covering materials for electric cables, parts for precise machines, other various industrial materials, and household goods, etc. However, since the thermoplastic resins have a drawback of readily burning, there are proposed many methods for flame retardation of the thermoplastic resins. As such the methods for flame retardation, there is a method in which a flame retardant is added to the thermoplastic resins, and which is most popular.

However, the flame retardant resin composition containing the flame retardant includes a problem that the flame retardant oozes out (it is to be noted that oozing out of a liquid flame retardant is occasionally called a bleeding, and oozing out of a solid flame retardant is occasionally called a blooming, however, in the present specification, a phenomenon of oozing out in the flame retardant is merely called bleeding regardless of kinds of the flame retardant) when it is stored at high temperature for a long time of period, and it makes an outer appearance of a final product worse.

Further, since the flame retardant oozes out onto surface of resins by bleeding of the flame retardant, it is becoming problematic from a hygienic viewpoint because the flame retardant adheres to a human body in handling the final product.

A variety of methods are proposed for solving the above-described problems. For example, although there are reported a method (JP-A-06299007 Official Gazette) in which a specified compound is mixed with a polyolefin resin and a method (JP-A-07053796 Official Gazette) in which inorganic fillers are formulated in a crystalline propylene polymer containing a halogen-contained flame retardant and an auxiliary agent for the flame retardant. However, it is an existing circumstance that the both methods are not satisfied in an effect for suppressing bleeding of the flame retardant.

Therefore, the No. II present invention aims to providing a flame retardant resin composition in which bleeding of a flame retardant is suppressed without allowing to lower a flame retardancy, and to providing a molded article therefrom.

Hereinafter, the No. I and No. II inventions are separately illustrated.

DISCLOSURE OF THE INVENTION

The inventors of the present invention, as a result of an intensive investigation for solving the above-mentioned problems in the No. I invention, found out that the above-mentioned problems can be effectively solved by mixing a specified amount of an organic ester compound for regenerating a PET resin, and attained to the invention.

That is, the No. I invention relates to a regenerated PET resin composition which comprises 100 parts by weight of a regenerated PET resin (A) and 0.5–100 part by weight of a lactone polymer (B). The present invention further relates to a regenerated PET resin composition further containing a polyolefin resin (C).

The present invention relates to a regenerated PET resin composition further containing other additives (D) composed of an inorganic compound or an organic compound. The present invention relates to a regenerated PET resin molded article which comprises molding the regenerated PET resin composition.

The inventors of the present invention, as a result of an intensive investigation for solving the above-mentioned problems in the No. II invention, found out that the above-mentioned problems can be effectively solved by mixing a specified amount of a polyester resin, and attained to the invention.

That is, the No. II-1 of the invention (hereinafter, referred to "II-1 invention") relates to a flame retardant resin composition in which there are contained 100 parts by weight of a thermoplastic resin and 0.5–100 part by weight of a flame retardant which comprises mixing 100 parts by weight of a flame retardant (F) with 1–200 part by weight of a mixture composed of a polyester resin (G) and an ester compound (H) of a polyglycerine or glycerine with a higher fatty acid. Further, it relates to a flame retardant resin composition further containing an additive (I) consisting of at least one inorganic compounds, organic compounds, or other additives for resins in the above-described composition. Still further, it relates to a flame retardant resin composition in which a mixing weight ratio is (G):(H)=85–99.5:0.5–15 (total of both weight ratio is 100) in a mixture composed of the above-described polyester resin (G) and ester compound (H) of a polyglycerine or glycerine with a higher fatty acid.

Particularly, it relates to a flame retardant resin composition in which the flame retardant (F) is composed of at least any one kind of a bromine-based flame retardant, a chlorine-based flame retardant, a phosphorus-based flame retardant, a phosphate-based flame retardant, a polyphosphoric acid-based flame retardant, a nitrogen compound-based flame retardant, or an inorganic-based flame retardant. Further, it relates to a resin composition in which the polyester resin (G) is an aliphatic or aromatic polyester resin. Still further, it relates to a resin composition in which the aliphatic polyester resin is a lactone polymer (B).

Also, it relates to a flame retardant resin composition in which the ester compound (H) of a polyglycerine or glycerine with a higher fatty acid is at least any one of a monoglyceride, diglyceride, triglyceride, a diglycerine fatty acid ester, a triglycerine fatty acid ester, a tetraglycerine fatty acid ester, a pentaglycerine fatty acid ester, a hexaglycerine fatty acid ester, and a decaglycerine fatty acid ester. Further, the present invention relates to a flame retardant resin molded article which comprises molding any one of the above-described flame retardant resin compositions.

The No. II-2 of the invention (hereinafter, referred to "II-2 invention") relates to a flame retardant resin composition in which 1–200 parts by weight of a polyester resin (G) is mixed with 100 parts by weight of the flame retardant (F) in the flame retardant resin composition containing 100 parts by weight of the thermoplastic resin (E) and 0.5–100 parts by weight of the flame retardant (F). Further, it relates to a flame retardant resin composition in which the above-described composition is mixed with other additives (I) composed of at least any one of inorganic or organic compound, or other additives for resins.

Particularly, it relates to a flame retardant resin composition in which the above-described flame retardant (F) is composed of at least any one kind of a bromine-based flame retardant, a chlorine-based flame retardant, a phosphorus-based flame retardant, a phosphate-based flame retardant, a phosphoric acid-based flame retardant, a nitrogen compound-based flame retardant, or an inorganic-based flame retardant. Further, it relates to a flame retardant resin composition in which the above-described polyester resin (G) is an aromatic or aliphatic polyester resin. Also, it relates to a flame retardant resin composition in which the aliphatic polyester resin is a lactone polymer. Still further, it relates to a flame retardant resin molded article molded from the flame retardant resin composition.

The No. II-3 of the invention (hereinafter, referred to "II-3 invention") relates to a flame retardant polyolefin resin composition which comprises mixing 1–30 parts by weight of a polyester resin (G) is mixed with 100 parts by weight of the resin composition composed of 100 parts by weight of a polyolefin resin (P) and 0.2–40 parts by weight of a halogen-based flame retardant (FD). Further, it relates to a flame retardant polyolefin resin composition further containing other additives (I) composed of at least any one of inorganic or organic compound, or other additives for resins. Also, it relates to a flame retardant polyolefin resin composition in which the halogen-based flame retardant (FD) in the above-described invention is an organic compound containing a halogen. Also, it relates to a flame retardant polyolefin resin composition in which the organic compound containing a halogen is a phosphate containing a halogen. Also, it relates to a flame retardant polyolefin resin composition in which the polyester resin (G) in the above-described invention is an aromatic or aliphatic polyester resin. And also, it relates to a flame retardant polyolefin resin molded article having a flame retardancy which comprises molding a flame retardant polyolef in resin composition in which the aliphatic polyester resin is a lactone polymer (B) and the above-described polyolefin resin composition.

The No. II-4 of the invention (hereinafter, referred to "II-4 invention") relates to a flame retardant resin composition containing 100 parts by weight of a thermoplastic resin (E) and 0.2–40 parts by weight of a flame retardant (F) in which 0.5–50 parts by weight of an ester compound (H) of a polyglycerine or glycerine with a higher fatty acid is mixed with 100 parts by weight of a flame retardant (F). It relates to a flame retardant resin composition which comprises further containing additives (r) composed of at least any one kinds of inorganic compounds, organic compounds, and other additives for resins. Particularly, it relates to a flame retardant resin composition in which the above-described flame retardant (F) is composed of at least any one kind of a bromine-based flame retardant, a chlorine-based flame retardant, a phosphorus-based flame retardant, a phosphate-based flame retardant, a polyphosphoric acid-based flame retardant, a nitrogen compound-based flame retardant, or an inorganic-based flame retardant. Further, it relates to flame retardant resin composition in which the ester compound (H) of a polyglycerine or glycerine with a higher fatty acid is at least any one of a monoglyceride, diglyceride, triglyceride, a diglycerine fatty acid ester, a triglycerine fatty acid ester, a tetraglycerine fatty acid ester, a pentaglycerine fatty acid ester, a hexaglycerine fatty acid ester, and a decaglycerine fatty acid ester. Further, other means in the present invention relates to a flame retardant resin molded article which comprises molding any one of the above-described respective flame retardant resin compositions.

BEST MODE FOR CARRYING OUT THE INVENTION

Hereinafter, embodiments for carrying out the Nos. I and II inventions are illustrated in order.

The No. I invention is illustrated.

Constructing Components
<Regenerated PET Resin (A)>

The PET to be employed in the present invention is an abbreviation of a polyethylene terephthalate, and it is a resin obtained by a polymerization reaction of a glycol ester of terephthalic acid until a fixed polymerization degree under the presence of a catalyst, and the glycol ester is obtained by a thermal reaction under the presence of a catalyst using terephthalic acid or an ester-formable derivative (for example, a lower alkyl ester such as a dimethyl ester and monoester) and ethylene glycol or the ester-formable derivative as starting raw materials.

The regenerated PET resin (A) in the present invention means a resin recycled and treated in order to utilize after the PET was molded and used as a product such as bottles for beverages, textiles, films, and a large-sized molded article such as container, and it is usually called a regenerated PET materials or a recycled PET. The regenerated PET resin (A) to be employed in the present invention is not limited to a product form of a PET to be regenerated and, specifically, there can be exemplified bottles for beverages, textiles, films, and a molded article, etc. Further, it also includes a PET material such as chips of films and gates or runners in injection-molded articles which are produced in the preparation of final products, even though those are not employed as the final products.

<Lactone Polymer (B)>

The lactone polymer (B) to be employed in the present invention can be obtained by a ring-opening polymerization of a lactone having a carbon number of 4–11. Specifically, a poly-ε-caprolactone is preferred. Further, there can be employed a copolymer in which there are employed comonomers such as valerolactone, glycolide, and lactide other than ε-caprolactone monomer.

As a lactone polymer other than the above-described ones, there may be also employed a polycaprolactone in which terminal groups are capped.

The lactone polymer (B) in the present invention is obtained by a continuous or batchwise reaction at 120–230° C., preferably 140–220° C. while agitating for several hours, in which a polymerization initiator is added to a lactone monomer and, preferably, and a catalyst is optionally employed.

The polymerization initiator to be employed in the preparation of a lactone polymer (B) described in the present invention is water or a compound having hydroxyl groups at terminals and, as the compound having hydroxyl groups at terminals, there can be exemplified, for example, a monovalent alcohol such as n-hexyl alcohol, n-heptyl alcohol, n-octyl alcohol, n-nonyl alcohol, lauryl alcohol, and mylistyl alcohol, glycols such as ethylene glycol, propylene glycol, ethylethylene glycol, 1,4-butanediol, 2,3-butylene glycol, 2-methyl-1,2-propane diol, pinachol, β-butylene glycol, diethylene glycol, pentamethylene glycol, tetramethylene glycol, neopentyl glycol, and 1,4-cyclohexane dimethanol, trivalent alcohols such as glycerine, 1,2,3-butane triol, 1,2,3-pentane triol, trimethylol propane, and ditrimethylol propane, or derivatives thereof, tetravalent alcohols such as erythrit and pentaerythritol, aromatic alcohols such as phenol, bisphenol A, 2,4,6-tribromophenol, and tetrabromobisphenol A, monovalent carboxylic acids such as benzoic acid, p-methyl benzoic acid, lauric acid, myristic acid, 2,3,4-tribromobenzoic acid, pentabromobenzoic acid, divalent carboxylic acids such as isophthalic acid, phthalic acid, terephthalic acid, 2,6-naphthalene dicarboxylic acid, 4,4'-diphenoxyethane dicarboxylic acid, succinic acid, adipic acid, sebasic acid, azelaic acid, decadicarboxylic acid, cyclohexane dicarboxylic acid, tetrachlorophthalic acid, and tetrabromophthalic acid, trivalent carboxylic acids such as tricarbaryl acid, trimerysic acid, and trimeritic acid, tetravalent carboxylic acids such as pyromeritic acid, oxycarboxylic acids such as ε-oxycarboxylic acid and hydroxyethoxy benzoic acid, etc. Further, as the catalyst for the polymerization, there can be employed a variety of organic or inorganic metal compounds, etc. and, specifically, there can be enumerated tetrabutyl titanate, tetraisopropyl titanate, tetraethyl titanate, dibutyltin oxide, dibutyltin laurate, stannous octylate, and stannous chloride, etc. Use amount of the catalysts is 0.1–1,000 ppm, and preferably 0.5–500 ppm based on starting raw materials.

A molecular weight of the lactone polymer (B) to be employed in the present invention is 1,000–500,000, preferably 5,000–200,000, and more preferably 10,000–100,000 as a number average molecular weight.

In the case that the number average molecular weight is less than 1,000, there is not shown an effect for improving a molding processability of the regenerated PET resin and, in the case of more than 500,000, it cannot be melt-kneaded into the regenerated PET resin. The number average molecular weight described herein is a number average molecular weight measured using a liquid chromatograph.

<Polyolefin Resin (C)>

The polyolefin resin (C) to be employed in the composition of the present invention can be freely selected from an olefin polymer such as a low density polyethylene, a high density polyethylene, a linear-state polyethylene, a polybutadiene, a polypropylene, a poly-1-butene, a poly-1-pentene, a poly-4-methyl-1-pentene, and a mixture thereof, an ethylene-vinyl acetate copolymer, a copolymer of ethylene, propylene, 1-butene, 1-pentene, and a mixture thereof, a polyolefin-based elastomer such as an ethylene-propylene rubber (EPM, EPR), an ethylene-propylene-diene terpolymer (EPDM, EPD, EPT), and a mixture thereof, a mixture of the polyolefin-based elastomer with an olefin polymer such as polyethylene, a polypropylene, and an ethylene-propylene copolymer, a copolymer of other vinyl-based monomer primarily containing an olefin, or a mixture of two or more kinds of the above-described ones, and it includes a polyolefin resin (P) which is employed in the No. II invention described hereinafter.

<Additives (D)>

In the composition of the present invention, as the other additives (D), there can be mixed the inorganic compounds, the organic compounds, or the other additives for resins, etc.

As the additives for resins, there are enumerated a stabilizer, a coloring agent, a weatherability agent (an ultraviolet ray absorbent), a lubricant, an antistatic agent, an extender, and other additives. There can be also added to the polyolefin resin (C) in addition to a case of being originally contained in the regenerated PET resin.

<Formulating Amount of Respective Components>

In the regenerated PET resin composition of the present invention, 0.5–100 parts by weight of a lactone polymer (B) is preferably formulated based on 100 parts by weight of a regenerated PET resin (A), and 1–20 parts by weight of a lactone polymer (B) is more preferably formulated based on 100 parts by weight of a regenerated PET resin (A). In the case that the lactone polymer (B) is less than 0.5 part by weight, there is not shown an effect for improving a molding processability of the regenerated PET resin composition and, in the case of more than 100 parts by weight, there is caused a disadvantage of decline in a strength of a molded article. Formulation of 1–20 parts by weight in the lactone polymer (B) is particularly effective in a viewpoint of an improvement of moldability.

The polyolefin resin (C) is preferably formulated in 1–100 parts by weight, preferably 20–100 parts by weight based on 100 parts by weight of a regenerated PET resin. By the formulation of the polyolefin resin (C), although there is shown an effect that moldability is improved, in the case of less than 1 part by weight, there is not shown an effect that moldability is improved and, on the other hand, in the case of more than 100 parts by weight, strength of a molded article tends to lower.

<Method for the Preparation and Method for Molding of the Regenerated PET Resin Composition>

The composition of the present invention is usually prepared by publicly-known methods. For example, there is enumerated a method in which there are melt-kneaded the regenerated PET resin (A), the lactone polymer (B), and optionally, the polyolefin resin (C) and other additives (D) in an extruder, a kneader, a roll, and a Banbury mixer, or a method in which particle-state substances are mechanically and uniformly mixed each other, and then, molding is conducted together with mixing in an injection molding machine.

Although thus-obtained regenerated PET resin composition may be once extruded to prepare pellets, preferably, it is simultaneously or subsequently molded to prepare a molded article by an extrusion molding, an injection molding, and compression molding, etc. together with mixing. The molded article is also excellent in heat resistance and an electric insulation property in addition to mechanical properties.

<Uses of the Regenerated PET Resin Composition>

The regenerated PET resin composition of the present invention can be employed for a variety of molded articles in place of conventional thermoplastic resins. For example, it is useful for home electric appliances, specifically, a cover for a refrigerator, a condenser cover for a washer, a backside cover for a TV, a speaker box for a TV, a deflecting york for a TV, a plug and socket, a socket for a christmas light, a CRT monitor body, an impeller in a blowing outlet for an air conditioner, a wind-direction plate and a cover for a body, a cover for a moisture conditioner, a door for a microwave oven, a seat for a water closet and a hot water tank, a motor cover and a control panel for an electric fan, a connector, a toner box for a PPC, a cover for a ventilating fan, materials for civil engineering and construction, specifically, a trough, a cover for buried electric cables, a pipe cover, monofilaments for flat yarns and a laminate film, a chair and backside cover in an athletic field, a flower pot for plants, an OA floor, materials for cars, specifically, a corrugate tube for electric cables, a floor mat, a door rim, a seat and a lining for a trunk room, a battery case, a cooling fan for a radiator, a protecting plate in an engine room, an instrument panel, a trim for internal decoration, a globe box, a console box, a fan shroud, a housing for an air cleaner, a seat frame, a connector, an ash tray, others, a PP band, a variety of connectors, a pallet, a container, and tray, etc.

Hereinafter, a mode for carrying out the No. II invention is illustrated.

Constructing components shown hereinafter are commonly employed in the (2-1)-(2-4) inventions.

<Thermoplastic Resin (E)>

The thermoplastic resin (E) to be employed in the present invention is not particularly limited, if it is melted by heating and solidified again by cooling and it is a resin having a property in which melting and solidification can be reversibly repeated.

Specifically, the thermoplastic resin includes a polyolefin resin (P) described as a constructing component in the No. I invention, and there can be enumerated a vinyl chloride-based resin such as a vinyl chloride, a vinylidene chloride, a vinyl chloride copolymer, for example, a vinyl chloride-vinyl acetate copolymer, a vinyl chloride-ethylene copolymer, a copolymer in which vinyl chloride is grafted on an ethylene-vinyl acetate copolymer, a polystyrene, a styrene-based resin such as an acrylonitrile-butadiene-styrene copolymer, an acrylic-based resin, engineering plastic resins such as a polycarbonate, a polyethylene terephthalate, a polybutylene terephthalate, a polyphenylene oxide, and a polyphenylene sulphide, etc.

Further, there is also included a resin containing at least one of the above-described various polymers.

<Flame Retardant (F)>

The flame retardant (F) in the present invention is not particularly limited, if it is a substance which is added for giving a flame retardancy to resins. Specifically, it is a halogen-contained organic compound and a phosphorus-contained organic compound and, which has at least one halogen in the molecule. As the flame retardant (F) which is added for giving a flame retardancy to resins, for example, there can be enumerated a bromine-based flame retardant such as decabromodiphenyl oxide, octabromodiphenyl oxide, tetrabromodiphenyl oxide, hexabromocyclododecane, bis(2,4,6-tribromophenoxy) ethane, ethylenebistetrabromophthalic imide, hexabromobenzene, polydibromophenyleneoxide, terabromobisphenol-S, 1,1-sulphonyl[3,5-dibromo-4-(2,3-dibromopropoxy)]benzene, tris(2,3-dibromopropyl-1) isocyanurate, tribromophenol, tribromophenyl allylether, tri-bromoneopentyl alcohol, a brominated polystyrene, a brominated polyethylene, terabromobisphenol-A, a terabromobisphenol-A-epoxy oligomer, a terabromobisphenol-A-carbonate oligomer, terabromobisphenol-A-bis(2-hydroxydiethylether), terabromobisphenol-A-bis(2,3-dibromopropylether), terabromobisphenol-A-bis(allylether), tetrabromocyclooctane, ethylenebistetrabromophthalic imide, ethylenebispentabromodiphenyl, a poly (pentabromobenzyl polyacrylate), and octabromotrimethylphenyl indane, a chlorine-based flame retardant such as a chlorinated paraffin and perchlorocyclopentadecane, and, as a halogen-contained phosphate, for example, there can be enumerated tris(2,3-dibromopropyl)phosphate, tris(2,3-bromochloropropyl)phosphate, tris(tribromoneopentyl) phosphate, and bis(2,3-dibromopropyl)phosphate)2,3-dichloropropylphosphate, etc.

Further, there can be enumerated a phosphate-based flame retardant such as trisphenyl phosphate, tricresyl phosphate, triethyl phosphate, cresyldiphenyl phosphate, xylenyldiphenyl phosphate, lesorcinolbis(diphenyl phosphate), trixylenylphosphate, trimethylphosphate, trimethyl phosphate, 2-ethylhexyl diphenylphosphate, dimethyl phosphate, triallyl phosphate, cresyl-2,6-xylenyl phosphate, bisphenol-A-bis(diphenyl phosphate), bisphenol-A-bis (dicresyl phosphate), tris(chloroethyl)phosphate, trisdichloropropyl phosphate, tris-β-chloropropyl phosphate, diethyl-N,N-bis(2-hydroxyethyl)aminomethyl phosphate, and tris (2,6-dimethylphenyl)phosphate, a phosphorus-based flame retardant such as red phosphorus (usually coated by a phenol resin, etc. in order to stabilize red phosphorus), a polyphosphoric acid-based flame retardant such as polyphosphoric acid ammonium amide, melamine pyrophosphate, and melamine polyphosphate, a nitrogen compound-based flame retardant such as melamine cyanurate, and a inorganic-based flame retardant such as magnesium hydroxide, aluminum hydroxide, antimony trioxide, antimony pentaoxide, zinc hydroxy stannate, zinc stannate, metastannic acid, tin oxide, zinc oxide, ferric oxide, ferrous oxide, stannic oxide, and stannous oxide, etc.

Preferably, there are terabromobisphenol-A, terabromobisphenol-A-bis(2,3-dibromopropylether), tris (tribromoneopentyl)phosphate, 1,1-sulphonyl[3,5-dibromo-4-(2,3-dibromopropoxy)]benzene, decabromodiphenyl oxide, perchlorocyclopentadecane, ethylenebispentabromodiphenyl, octabromotrimethylphenyl indane, hexabromocyclododecane, red phosphorus, trisphenyl phosphate, cresyldiphenyl phosphate, xylenyldiphenyl phosphate, lesorcinolbis(diphenyl phosphate), trixylenylphosphate, cresyl-2,6-xylenyl phosphate, bisphenol-A-bis(diphenyl phosphate), bisphenol-A-bis (dicresylphosphate), melamine cyanurate, and polyphosphoric acid ammonium amide, etc.

These flame retardants can be employed in at least any one kind. Also, of those, as the halogen-based flame retardant, there are preferred terabromobisphenol-A, terabromobisphenol-A-bis( 2,3-dibromopropylether), tris (tribromoneopentyl)phosphate, 1,1-sulphonyl[3,5-dibromo-4-(2,3-dibromopropoxy)]benzene, and decabromodiphenyl oxide and, particularly, preferably, terabromobisphenol-A-bis(2,3-dibromopropylether) and 1,1-sulphonyl[3,5-dibromo-4-(2,3-dibromopropoxy)]benzene, and ethylenebispentabromodiphenyl, etc. The halogen-contained organic compounds and phosphorus-contained organic compounds can be employed in at least any one kind.

<Polyester Resin (G)>

In the present invention, the polyester resin (G) is employed as one component in improvers. As the polyester resin (G), there are employed the lactone polymer (B) illustrated in the No. I invention, an aliphatic or aromatic polyester resin obtained by a condensation reaction of an aliphatic dicarboxylic acid such as oxalic acid, succinic acid, glutaric acid, adipic acid, pimelic acid, sberic acid, azelaic acid, and dodecanoic acid, or an aromatic dicarboxylic acid such as terephtahlic acid, isophtahlic acid, and orthophtahlic acid with an aliphatic diol such as ethylene glycol, 1,3-propane diol, 1,4-butane diol, neopentyl glycol, 1,5-pentane diol, 3-methyl-1,5-pentane diol, 1,6-hexane diol, and 1,9-nonane diol, a cycloaliphatic diol such as cyclohexane-1,4-dimethanol, and an ether-based diol, such as tetramethylene glycol, a lactone-modified polyester resin made from a copolymerization of a polyester resin with lactones, a resin polymerized from a hydroxycarboxylic acid, a copolymerized resin of 3-hydroxybutylate with hydroxycarboxylic acids such as 3-hydroxyvalirate, and a mixture thereof.

The aliphatic or aromatic dicarboxylic acids may be employed in combination of two or more kinds. Also, the diols can be employed in combination of two or more kinds. Of those, preferred polyester resin is the lactone polymer (B), specifically, a poly-ε-caprolactone is preferred. Further, in addition to ε-caprolactone monomer, a copolymer can be also employed, in which there are employed comonomers such as valerolactone, glycolide, and lactide.

In the polyester resin (G) to be employed in the present invention, a molecular weight is 1,000–500,000, preferably 5,000–200,000 and, more preferably 30,000–100,000 as a number average molecular weight. In the number average molecular weight is less than 1,000, an effect for preventing bleeding is not obtained in the flame retardants and, in the case of more than 500,000, it cannot be melt-kneaded into the thermoplastic resins. The number average molecular weight shown herein is a number average molecular weight measured by a liquid chromatography.

The preparation of the lactone polymer (B) is as shown in the descriptions concerning the preparation of the lactone polymer (B) and the polymerization initiators in the No. I invention.

The aliphatic or aromatic polyester resins can be prepared by publicly-known methods.

For example, it can be obtained by a method in which a lower alcohol ester of the dicarboxylic acid is transesterified with an excess amount of a glycol under the presence of a catalyst to obtain a reaction product, and the reaction product is polycondensed, or a method in which the dicarboxylic acid is esterified with an excess amount of a glycol under the presence of a catalyst to obtain a reaction product, and it is polycondensed. Reaction temperature is 180–290° C., and preferably 200–280° C.

As the catalysts for polymerization, there can be enumerated a titanium compound, an antimony compound, a tin compound, a calcium compound, and a manganese compound, etc. Use amount of the catalysts is 0.1–1,000 ppm, and preferably 0.5–500 ppm based on starting raw materials.

<Ester Compound (H)>

In the present invention, as another component of the improvers, the ester compound (H) is employed which is synthesized from a polyglycerine or glycerine and a higher fatty acid. One raw material for the ester compound (H) is a polyglycerine or glycerine, and the polyglycerine is a polymer of glycerine. As the polyglycerine, there can be enumerated diglycerine, triglycerine, tetraglycerine, pentaglycerine, hexaglycerine, and decaglycerine, etc.

In the present invention, the higher fatty acid is a long chain fatty acid, which is employed as another raw materials for the ester compound (H). Specifically, there are exemplified a saturated fatty acid such as stearic acid, palmitic acid, myristic acid, lauric acid, capric acid, caprylic acid, and erucic acid, an unsaturated fatty acid such as oleic acid, behenic acid, and linoleic acid, a hydroxy fatty acid such as sabinic acid, iproic acid, yarapinol acid, uniperic acid, anbletol acid, aluit acid, camloreic acid, feronic acid, celeblonic acid, 2-hydroxyoctadecanoic acid, 2-hydroxyhexadecanoic acid, 12-hydroxystearic acid, 18-hydroxyoctadecanoic acid, and 9,10-dihydroxyoctadecanoic acid, and those are utilized solely or as a mixture of two or more kinds.

The ester compound (H) in the present invention is synthesized by the above-described raw materials, and a synthesis method and an esterification degree (addition amount of the fatty acid) are not particularly limited. As the ester compound (H) in the present invention, there are specifically exemplified a monoglyceride, a diglyceride, a triglyceride, a fatty acid ester of diglycerine, a fatty acid ester of triglycerine, a fatty acid ester of tetraglycerine, a fatty acid ester of pentaglycerine, a fatty acid ester of hexaglycerine, and a fatty acid ester of decaglycerine, etc., and the ester compound (H) is constructed solely or in combination of two or more kinds.

<Other Additives (I)>

The other additives (I) is composed of at least one of an inorganic compound, an organic compound, and other additives for resins, and it is the same as in the additives (D) in the No. I invention. As the additives for resins, there are enumerated a stabilizer, a coloring agent, a weatherability agent (an ultraviolet ray absorbent), a lubricant, an antistatic agent, an extender, and other additives, and these may be also added to the thermoplastic resin (E), for example, a polyolefin resin. As the inorganic compound which is the additives (I), in addition to fillers for resins, there can be employed other kinds of flame retardants except ones employed as the (F). As auxiliary agent for the flame retardant, there may be employed other kinds of flame retardants, for example, an antimony oxide such as antimony trioxide and antimony pentaoxide and, in the case, use amount of the halogen-based flame retardant (FD) may be smaller amount.

As the thermoplastic resin which is one of the additives (I), if it is compatible with the flame retardant polyolef in resin composition of the present invention, it can be particularly employed without any limitations.

<Formulating Amount of Respective Components>

The flame retardant resin composition of the II-1 invention contains 0.5–100 parts by weight of the flame retardant (F) with respect to 100 parts by weight of the thermoplastic resin (E).

In the case that the flame retardant (F) is less than 0.5 part by weight, a flame retardant property is insufficient in a composition obtained and, in the case of exceeding 100 parts by weight, strength lowers in a composition, resulting in that there is caused a problem that there lower molding processability and pelletizing processability.

In the present invention, addition amount of a mixture composed of the polyester resin (G) and the ester compound (H) of a polyglycerine or glycerine with a higher fatty acid is 1–200 parts by weight based on 100 parts by weight of the flame retardant (F).

In the case that the addition amount of a mixture composed of the polyester resin (G) and the ester compound (H) is less than 1 part by weight based on 100 parts by weight of the flame retardant (F), there cannot be obtained an effect for preventing bleeding and, in the case of exceeding 200 parts by weight, physical properties and pelletizing processability unpreferably lower in a composition.

Further, in the mixture composed of the polyester resin (G) and the ester compound (H), mixing ratio by weight of (G):(H) is preferably 85–99.5:0.5–15 (total amount of both is 100). In the case that the addition amount of the ester compound (H) is less than 0.5 weight ratio, there is not shown an effect for improving a bleeding property in a final product for a long time of period and, in the case of exceeding 15 weight ratio, a bleeding property is obstructed in a final product, and further, and a flame retardancy lowers in the resin composition itself.

In the composition of the present invention, other additives (I) can be optionally employed, and these can be in advance added to the thermoplastic resin (E).

<Examples of a Flame Retardant Resin Composition>

In the present invention, formulation of the mixture in which the polyester resin (G) is mixed with the ester compound (H) shows an effect for preventing bleeding of a phosphate, preferably, trisphenyl phosphate, cresyldiphenyl phosphate, xylenyldiphenyl phosphate, lesorcinolbis (diphenyl phosphate), trixylenyl phosphate, cresyldi-2,6-xylenyl phosphate, bisphenol-A-bis(diphenylphosphate), and bisphenol-A-bis(dicresylphosphate).

For that reason, it is useful as an anti-bleeding agent for the phosphates.

Further, in the case that a phosphate such as trisphenyl phosphate is employed in flame retardant resin compositions described hereinafter, there is particularly shown an effect for preventing bleeding.

1. Resin composition composed of (a) a polystyrene, (b) a polyphenylene oxide, (c) a phosphate-based flame retardant such as trisphenyl phosphate, and (d) a melamine isocyanurate.

2. Resin compositioncomposedof (a) apolycarbonate, (b) an ABS resin, and (c) a phosphate-based flame retardant such as trisphenyl phosphate.

Accordingly, the mixture composed of the polyester resin (G) and the ester compound (H) is desirably added as an anti-bleeding agent in the flame retardant resin compositions. Also, in a resin composition in which the mixture composed of the polyester resin (G) and the ester compound (H) is desirably added as an anti-bleeding agent in the flame retardant resin compositions, the flame retardant does not bleed, and it is useful as a resin composition in which a flame retardancy is given.

<Method for the Preparation of the Flame Retardant Resin Composition>

The composition of the present invention is usually prepared by publicly-known methods. For example, there are enumerated a method in which there are melt-kneaded the thermoplastic resin (E), the flame retardant (F), the polyester resin (G), the ester compound (H) of a polyglycerine or glycerine with a higher fatty acid, and other additives (I) in an extruder, a kneader, a roll, and a Banbury mixer, or a method, etc. in which particle-state substances are mechanically and uniformly mixed each other, and then, molding is conducted together with mixing in an injection molding machine. Further, although a mixing order may be voluntary in the case, it is a preferred method that there are premixed the flame retardant (F), the polyester resin (G), and the ester compound (H), followed by mixing a mixture into a resin, and mixing method of respective components can be appropriately changed.

<Molding Method of the Flame Retardant Resin Composition>

Although thus-obtained flame retardant resin composition is subsequently molded to prepare a molded article by an extrusion molding, an injection molding, and compression molding, etc. together with mixing. The molded article is also excellent in flame retardancy, heat resistance and an electric insulation property in addition to mechanical properties and, in which the flame retardant does not bleed, and outer appearance is also excellent.

<Uses of the Flame Retardant Resin Composition>

The flame retardant resin composition of the present invention can be employed for a variety of molded articles in place of conventional thermoplastic resins containing a flame retardant (F). For example, it is useful for home electric appliances, specifically, a cover for a refrigerator, a condenser cover for a washer, a backside cover for a TV, a speaker box for a TV, a deflecting york for a TV, a plug and socket, a socket for a Christmas light, a CRT monitor body, an impeller in a blowing outlet for an air conditioner, a wind-direction plate and a cover for a body, a cover for a moisture conditioner, a door for a microwave oven, a seat for a water closet and a hot water tank, a motor cover and a control panel for an electric fan, a connector, a toner box for a PPC, a cover for a ventilating fan, materials for civil engineering and construction, specifically, a trough, a cover for buried electric cables, a pipe cover, monofilaments for flat yarns and a laminate film, a chair and back cover in an athletic field, a flower pot for plants, an OA floor, materials for cars, specifically, a corrugate tube for electric cables, a floor mat, a door rim, a seat and a lining for a trunk room, a battery case, a cooling fan for a radiator, a protecting plate in an engine room, an instrument panel, a trim for internal decoration, a glove box, a console box, a fan shroud, a housing for an air cleaner, a seat frame, a connector, an ash tray, others, a PP band, a variety of connectors, and a pallet, etc.

The flame retardant resin composition of the II-2 invention comprises formulating 1–200 parts by weight of the polyester resin (G) based on 100 parts by weight of the flame retardant (F), in the flame retardant resin composition containing 0.5–100 parts by weight of the flame retardant (F) based on 100 parts by weight of the thermoplastic resin (E). In the case that the flame retardant (F) is less than 0.5 parts by weight, a flame retardancy is insufficient in a composition obtained and, in the case of exceeding 100 parts by weight, a strength lowers in a composition, resulting in that there is caused a disadvantage that there lower molding processability and pelletizing processability.

In the present invention, addition amount of the polyester resin (G) is 1–200 parts by weight based on 100 parts by weight of the flame retardant (F). In the case that the addition amount of the polyester resin (G) is less than 1 part by weight with respect to the flame retardant, there cannot be obtained an effect for preventing bleeding and, in the case of exceeding 200 parts by weight, physical properties and pelletizing processability unpreferably lower in a composition. Further, in the composition of the present invention, other additives (I) can be optionally employed, and these can be in advance added to the thermoplastic resin (E).

<Examples of the Flame Retardant Resin Composition of the No. II-2 Invention>

In the present invention, the polyester resin (G) shows an effect for preventing bleeding when there are employed a phosphate, preferably, trisphenyl phosphate, cresyldiphenyl phosphate, xylenyldiphenyl phosphate, lesorcinolbis (diphenyl phosphate), trixylenylphosphate, cresyldi-2,6-xylenylphosphate, bisphenol-A-bis(diphenyl phosphate), and bisphenol-A-bis(dicresyl phosphate) as the flame retardant (F). For that reason, it is useful as an anti-bleeding agent for the phosphates.

Further, by the use of a phosphate such as trisphenyl phosphate, there is particularly shown an effect for preventing bleeding in the same resin composition as in a flame retardant resin composition illustrated in the No. II-1 invention.

That is, 1. Resin compositioncomposedof (a) apolystyrene, (b) a polyphenylene oxide, (c) a phosphate-based flame retardant such as trisphenyl phosphate, and (d) a melamine isocyanurate.

2. Resin composition composed of (a) a polycarbonate, (b) an ABS resin, and (c) a phosphate-based flame retardant such as trisphenyl phosphate.

Accordingly, the polyester resin (G) is desirably added as an anti-bleeding agent in the above-described flame retardant resin compositions. Also, in a resin composition in which the polyester resin (G) in the present invention is added, the flame retardant does not bleed, and it is useful as a resin composition in which a flame retardancy is given.

Method for the preparation of the flame retardant resin composition of the No. II-2 invention is according to the II-1 invention. Addition order may be free, and there is also a desired method in which the flame retardant (F) is premixed with the polyester resin (G), followed by mixing with a resin. Method for molding of the flame retardant resin composition of the invention and uses thereof are also according to the II-1 invention.

The flame retardant polyolefin resin composition of the II-3 invention comprises mixing 1–30 parts by weight of a polyester resin (G) is mixed with 100 parts by weight of the resin composition composed of 100 parts by weight of a polyolefin resin (P) and 0.2–40 parts by weight of a halogen-based flame retardant (FD). In the case that the halogen-based flame retardant (FD) is less than 0.2 part by weight, a flame retardant property is insufficient in a composition obtained and, in the case of exceeding 40 parts by weight, there is caused a disadvantage that a physical property, particularly, strength unpreferably lowers in a composition.

Herein, the polyolef in resin (P) is one of resins which construct the above-described thermoplastic resin composition (E), and it is as descriptions illustrated hereinabove. Further, the halogen-based flame retardant (FD) is one of the above-described flame retardant (F), and it is as descriptions illustrated hereinabove.

In the present invention, addition amount of the polyester resin (G) is 1–30 parts by weight based on 100 parts by weight of the resin composition comprising the polyolef in resin (P) and the halogen-based flame retardant (FD). In the case that the addition amount of the polyester resin (G) is less than 1 part by weight, there cannot be obtained an effect for preventing bleeding and, in the case of exceeding 30 parts by weight, physical properties and pelletizing processability unpreferably lower in a composition.

Further, in the polyolefin resin composition of the present invention, other additives (I) can be optionally employed, and these can be in advance added to the polyolefin resin (P)

A method for the preparation of the flame retardant polyolefin resin is according to the II-1 invention. Addition order may be free, and there is also a desired method in which the halogen-based flame retardant (FD) is premixed with the polyester resin (G), followed by mixing with a resin.

Further, a method for molding of the flame retardant resin composition of the invention and uses thereof are also according to the II-1 invention.

The flame retardant resin composition of the No. II-4 invention comprises formulating 100 parts by weight of a thermoplastic resin (E) and 0.2–40 parts by weight of a flame retardant (F) in which 0.5–50 parts by weight of an ester compound (H) of a polyglycerine or glycerine with a higher fatty acid is mixed with 100 parts by weight of a flame retardant (F). In the case that the flame retardant (F) is less than 0.2 part by weight, there cannot be obtained an effect for preventing bleeding in a composition obtained and, in the case of exceeding 40 parts by weight, there is caused a disadvantage that a physical property, particularly, strength unpreferably lowers in a composition.

In the present invention, addition amount of the ester compound (H) is 0.5–50 parts by weight with respect to 100 parts by weight of the flame retardant (F).

In the case that the addition amount of the ester compound (H) is less than 0.5 part by weight, there cannot be obtained an effect for preventing bleeding and, in the case of exceeding 50 parts by weight, there is caused a disadvantage that a physical property and pelletizing processability unpreferably lowers in a composition.

In the composition of the present invention, other additives (I) can be optionally employed, and these can be also in advance added to the thermoplastic resin (E).

Method for the preparation of the flame retardant resin composition is according to the II-1 invention. Addition order may be free, and there is also a desired method in which the flame retardant (F) is premixed with the ester compound (H) and optionally, the other additives (I), followed by mixing with a resin. Method for molding of the flame retardant resin composition of the invention and uses thereof are also according to the II-1 invention.

EXAMPLES

Hereinafter, although the No. I invention is specifically illustrated by Examples and Comparative Examples, the present invention is not limited thereto.

It is to be noted that a variety of test methods conducted in the Examples and Comparative Examples were according to the following methods.

<Pelletizing Property Test>

Pelletizing was conducted using a twin-screw extruder having a screw diameter of 30 mm. Conditions in pelletizing were visually observed, and a pelletizing property was judged by the following standards.

⊚: exceedingly excellent, ○: excellent, Δ: slightly worse, X: worse, XX: incapable of pelletizing <Injection Moldability Test>

Test pieces having 127×12.7×1.6 mm were prepared using an injection molding machine having a locking pressure of 40 tons.

Outer appearance of molded articles was visually observed, and an injection moldability was judged by the following standards.

⊚: exceedingly excellent, ○: excellent, Δ: slightly worse, X: worse, XX: incapable of molding <Strength Test>

According to JIS K7113, tensile strength and tensile elongation were measured.

Number Average Molecular Weight of an Improver (a Lactone Polymer)

In the lactone polymer employed, a number average molecular weight was measured by the following conditions.

Apparatus: HPLC MODEL LC-6A (manufactured by Shimadzu Seisakusyo, Ltd.)

Guard column: SHODEXKF-800P (10 mm×4.6 mmø) 1 piece

Column: SHODEX KF-804 (0.3 mm×8 mmø) 1 piece, KF-802.5 (0.3 m×8 mmø) 1 piece, KF-801 (0.3 m×8 mmø) 1 piece Detector: Shodex RI SE-51 (manufactured by Showa Denko, Ltd.)

Solvent: tetrahydrofran, chloroform or hexafluoroisopropanol

Solvent flow speed: 1 ml/min.

Column temperature: 40° C.

Sample volume: 20 µl which is 10 times-diluted by a solvent

<Examples and Comparative Examples of the No. I Invention

Examples 1–3 and Comparative Examples 1–3

In Examples 1–3, as the lactone polymer (B), 5 parts by weight of respective lactone resins (B1–B3) described hereinafter were blended with 100 parts by weight of a regenerated PET resin (A) (a trade name: PET-BTL, manufactured by Taisei Jushi, Ltd.) as illustrated in Table 1-1 described hereinafter.

Accordingly, addition amount of the lactone polymer (3) is 5 parts by weight based on 100 parts by weight of the regenerated PET resin (A).

Mixture obtained was pelletized at a molding temperature of 255° C. by melt-kneading using the twin-screw extruder having a screw diameter of 30 mm.

Further, test pieces having a fixed shape were molded from pellets obtained at a molding temperature of 255° C. and a mold temperature of 25° C. using the injection molding machine having a locking pressure of 40 tons, and strength was measured according to a JIS regulation. Results are shown in Table 1-1.

Comparative Example 1

In the Comparative Example 1, the same procedures were likewise followed as in the Example 1 except that the lactone polymer (B) was not added.

TABLE 1-1

|  | Example 1 | Example 2 | Example 3 | Comparative Example 1 |
|---|---|---|---|---|
| Regenerated PET resin (A) | 100 | 100 | 100 | 100 |
| Improver (B1) | 5 | 0 | 0 | 0 |
| Improver (B2) | 0 | 5 | 0 | 0 |
| Improver (B3) | 0 | 0 | 5 | 0 |
| Pelletizing property | ○ | ○ | ○ | x |
| Injection moldability | ⊚ | ⊚ | ⊚ | xx |

TABLE 1-1-continued

|  | Example 1 | Example 2 | Example 3 | Comparative Example 1 |
|---|---|---|---|---|
| Tensile Strength (kg/cm$^2$) | 578 | 594 | 624 | — |
| Tensile elongation (%) | 140 | 145 | 150 | — |

In the Table, the lactone polymer is represented as an improver.

Further, the Table represents an improver (B1)=trade name: PLACCEL H1P (a poly-ε-caprolactone having a number average molecular weight of 10,000 manufactured by Daicel Chemical Industries, Ltd.), an improver (B2)=trade name: PLACCEL H4 (a poly-ε-caprolactone having a number average molecular weight of 40,000 manufactured by Daicel Chemical Industries, Ltd.), and an improver (B3)=trade name: PLACCEL H7 (a poly-ε-caprolactone having a number average molecular weight of 70,000 manufactured by Daicel Chemical Industries, Ltd.) (the same in the Tables 1-2 and 1-3).

Examples 4–6 and Comparative Example 2

Test pieces were likewise prepared as in the Example 1 except that the fixed amount of the lactone polymer was changed as shown in Table 1-2, respectively, to evaluate the pelletizing property, injection moldability, and strength test. Results are shown in Table 1-2.

In the Examples 4–6, the lactone polymer (B) is 10 parts by weight based on 100 parts by weight of the regenerated PET resin (A). In the Comparative Example 2, the same procedures were likewise followed as in the Example 1 except that the lactone polymer (B) was not added.

TABLE 1-2

|  | Example 4 | Example 5 | Example 6 | Comparative Example 2 |
|---|---|---|---|---|
| Regenerated PET resin (A) | 100 | 100 | 100 | 100 |
| Improver (B1) | 10 | 0 | 0 | 0 |
| Improver (B2) | 0 | 10 | 0 | 0 |
| Improver (B3) | 0 | 0 | 10 | 0 |
| Pelletizing property | ⊚ | ⊚ | ⊚ | x |
| Injection moldability | ○ | ○ | ○ | xx |
| Tensile Strength (kg/cm$^2$) | 564 | 578 | 594 | — |
| Tensile elongation (%) | 140 | 145 | 145 | — |

Examples 7–8 and Comparative Example 3

Test pieces were likewise prepared as in the Example 1 except that a polypropylene (a trade name: MA4 manufactured by Mitsubishi Kagaku, Ltd.) was formulated in respective fixed amount shown in Table 1-3 as a polyolef in resin (C), and at a processing temperature of 240° C. in a pelletizing property and injection molding, followed by evaluating an extruding processability, injection moldability, and strength. Results are shown in Table 1-3.

It is to be noted that in the Example 7, the lactone polymer (B) is 10 parts by weight based on 100 parts by weight of the regenerated PET resin (A) and, in the Example 8, it is 10 parts by weight.

In the Comparative Example 3, the lactone polymer (B) is not added.

TABLE 1-3

|  | Example 7 | Example 8 | Comparative Example 3 |
|---|---|---|---|
| Regenerated PET resin (A) | 100 | 100 | 100 |
| Improver (B3) | 5 | 10 | 0 |
| Polypropylene | 100 | 100 | 100 |
| Pelletizing property | ◎ | ◎ | x |
| Injection moldability | ◎ | ◎ | xx |
| Tensile Strength (kg/cm$^2$) | 328 | 315 | — |
| Tensile elongation (%) | 180 | 185 | — |

As being distinct from the Table 1-1 to Table 1-3, pelletizing and injection molding are possible without any problems in the Examples 1–8 in which the resin composition of the present invention is employed, and strength was also excellent in molded articles obtained.

In the Comparative Examples 1–3, a pelletizing property is problematic, and molding was not able to conduct by an injection molding machine.

Hereinafter, although the No. II invention is specifically illustrated by Examples and Comparative Examples, the present invention is not limited thereto. It is to be noted that numbers of the Examples and Comparative Examples are newly designated from 1.

A variety of experiments conducted in the Examples and Comparative Examples for the No. II invention were according to the following methods.

<Bleeding Property in a Product>

Test pieces having 50×50×2 mm prepared by an injection molding method were placed in an oven at 80° C. for 1 month (in the II-1 invention) or 100 hours (in the II-2, II-3, and II-4 inventions), followed by visually observing an outer appearance, and judging the bleeding property according to the following judgement standards.

⊚: not bled at all and exceedingly fine o: not almost bled and fine

Δ: bleeding was largely observed and slightly worse

X: bleeding was exceedingly observed and worse

<Flame Retardancy>

Using test pieces having 127×12.7×1.6 mm prepared using an injection molding method, a burning test was conducted according to a vertically-burning test method by the USA UL regulation subject 94 (UL94) to evaluate the flame retardancy.

<Number Average Molecular Weight of an Improver>

Number average molecular weight of an improver (a polyester resin) was measured by the following conditions Apparatus: HPLC MODEL LC-6A (manufactured by Shimadzu Seisakusho, Ltd.)

Guard column: SHODEXKF-800P (10 mm×4.6 mmø) 1 piece

Column: SHODEX KF-804 (0.3 m×8 mmø) 1 piece, KF-802.5 (0.3 m×8 mmø) 1 piece, KF-801 (0.3 m×8 mmø) 1 piece Detector: Shodex RI SE-51 (manufactured by Showa Denko, Ltd.)

Solvent: tetrahydrofran, chloroform or hexafluoroisopropanol

Solvent flow speed: 1 ml/min.

Column temperature: 40° C.

Sample volume: 20 µl which is 10 times-diluted by a solvent

Examples and Comparative Examples in the No. II-1 Invention

Examples 1–16 and Comparative Examples 1–14

Examples 1–8

In Examples 1–8, a Henshel mixer was charged with 100 parts by weight of a polypropylene (E1) (a trade name: BC3 manufactured by Mitsubishi Kagaku, Ltd.) which is the thermoplastic resin (E), 14 parts by weight of a tetrabromobisphenol-A-bis(2,3-dibromopropylether) (F1) and 7 parts by weight of antimony trioxide (F2) which are the flame retardant (F), 6.0–6.9 parts by weight of a variety of polyester resins (G1–G3) which are the polyester resin (G), 0.1–1 part by weight of a variety of ester compounds (H1–H3), and 1 part by weight of carbon black which is a coloring agent, followed by mixing for 1 minute.

It is to be noted that the flame retardant (F) corresponds to 21.0 parts by weight based on 100 parts by weight of the thermoplastic resin (E), and a mixture of the polyester resin (G) with the ester compounds (H) corresponds to 33.3 parts by weight based on 100 parts by weight of the flame retardant (F).

Further, mixing ratio of the polyester resin (G) with respect to the ester compounds (H) is (G):(H)=92.9:7.1 in the Examples 1–5, (G):(H)=98.6:1.4 in the Examples 6–7, and (G):(H)=85.8:14.2 in the Example 8.

Mixtures obtained were pelletized by melt mixing at 230° C. using a twin-screw extruder having screw diameter of 30 mm.

Using pellets obtained in the respective Examples and Comparative Examples, test pieces having a fixed shape were prepared by an injection molding method at a resin temperature of 230° C. and a mold temperature of 50° C. to evaluate a long-term bleeding property and flame retardancy in products for a long period. Results are shown in Table 2-1.

TABLE 2-1

| No. | Example 1 | Example 2 | Example 3 | Example 4 | Example 5 | Example 6 | Example 7 | Example 8 |
|---|---|---|---|---|---|---|---|---|
| PP (E1) | 100 | 100 | 100 | 100 | 100 | 100 | 100 | 100 |
| Flame retardant (F1) | 14 | 14 | 14 | 14 | 14 | 14 | 14 | 14 |
| Flame retardant (F2) | 7 | 7 | 7 | 7 | 7 | 7 | 7 | 7 |
| Improver (G1) | 6.5 | 0 | 0 | 0 | 0 | 0 | 0 | 0 |
| Improver (G2) | 0 | 6.5 | 0 | 6.5 | 6.5 | 6.9 | 6.9 | 6.0 |
| Improver (G3) | 0 | 0 | 6.5 | 0 | 0 | 0 | 0 | 0 |
| Improver (H1) | 0.5 | 0.5 | 0.5 | 0 | 0 | 0.1 | 0 | 1.0 |
| Improver (H2) | 0 | 0 | 0 | 0.5 | 0 | 0 | 0 | 0 |
| Improver (H3) | 0 | 0 | 0 | 0 | 0.5 | 0 | 0.1 | 0 |
| Coloring agent | 1 | 1 | 1 | 1 | 1 | 1 | 1 | 1 |
| Anti-bleeding property for a long period in a final product | ⊚ | ⊚ | ⊚ | ⊚ | ⊚ | ⊚ | ⊚ | ⊚ |
| Flame retardancy (V-0 test) | Qualified | Qualified | Qualified | Qualified | Qualified | Qualified | Qualified | Qualified |

It is to be noted that in the Table 2-1 to Table 2-4, the polyester resin is represented as the improver G, and the ester compound of a polyglycerine or glycerine with a higher fatty acid is represented as the improver H.

Further, in the Table 2-1 to Table 2-2, the flame retardant (F1) represents tetrabromobisphenol-A-bis (dibromopropylether), the flame retardant (F2) represents antimony trioxide, the improver (G1) represents PLACCEL H4 (a poly-ε-caprolactone having a number average molecular weight of 40,000 manufactured by Daicel Chemical Industries, Ltd.), the improver (G2) represents PLACCEL H7 (a poly-ε-caprolactone having a number average molecular weight of 70,000 manufactured by Daicel Chemical Industries, Ltd.), the improver (G3) represents Bionolle 1003W (a succinic acid/1,4-butanediol-based polyester having a number average molecular weight of 43,000 manufactured by Showa Kobunshi, Ltd.), the improver (G4) represents PLACCEL H1P, the improver (H1) represents hexaglycerine pentastearate (a trade name: SY Glystar-PS-500 manufactured by Sakamoto Yakuhin Kogyo, Ltd.), the improver (H2) represents diglycerine stearate (a trade name: Rikemal S-71-D manufactured by Riken Vitamine, Ltd.), and the improver (H3) represents 12-hydroxystearic acid (a trade name: K-3 Wax manufactured by Kawaken Fine Chemical, Ltd.).

Comparative Examples 1–6

The same procedures were followed as in the Example 1 except that the polyester resin (G) or the ester compound (H) was added as shown in the Table 2-2.

It is to be noted that the flame retardant (F) is 21.0 parts by weight based on 100 parts by weight of the thermoplastic resin (E), and a mixture composed of the polyester resin (G) and the polyester resin (H) is 33.3 parts by weight based on 100 parts by weight of the flame retardant (F).

Further, a mixing ratio of the polyester resin (G) with respect to the polyester resin (H) is (G):(H)=100:0 in the Comparative Examples 1–3, and (G):(H)=71.4:28.6 in the Comparative Examples 4–6.

TABLE 2-2

| No. | Comparative Example 1 | Comparative Example 2 | Comparative Example 3 | Comparative Example 4 | Comparative Example 5 | Comparative Example 6 |
|---|---|---|---|---|---|---|
| PP (E1) | 100 | 100 | 100 | 100 | 100 | 100 |
| Flame retardant (F1) | 14 | 14 | 14 | 14 | 14 | 14 |
| Flame retardant (F2) | 7 | 7 | 7 | 7 | 7 | 7 |
| Improver (G1) | 7 | 0 | 0 | 0 | 0 | 0 |
| Improver (G2) | 0 | 7 | 0 | 5.0 | 5.0 | 5.0 |
| Improver (G3) | 0 | 0 | 7 | 0 | 0 | 0 |
| Improver (H1) | 0 | 0 | 0 | 2.0 | 0 | 0 |
| Improver (H2) | 0 | 0 | 0 | 0 | 2.0 | 0 |
| Improver (H3) | 0 | 0 | 0 | 0 | 0 | 2.0 |
| Coloring agent | 1 | 1 | 1 | 1 | 1 | 1 |
| Anti-bleeding property for a long period in a final product | × | × | × | × | × | × |
| Flame retardancy (V-0 test) | Qualified | Qualified | Qualified | Unqualified | Unqualified | Unqualified |

Examples 9–16

The same procedures were followed as in the Example 1 except that a variety of flame retardants (F) shown in the Table 2-3 were employed in a fixed amount shown in the Table 2-3.

It is to be noted that the flame retardant (F) is 20.0 parts by weight based on 100 parts by weight of the thermoplastic resin (E), and a mixture composed of the polyester resin (G) and the polyester resin (H) is 25 parts by weight based on 100 parts by weight of the flame retardant (F).

Further, a mixing ratio of the polyester resin (G) with respect to the polyester resin (H) is (G):(H)=94:6 by weight.

TABLE 2-3

| No. | Example 9 | Example 10 | Example 11 | Example 12 | Example 13 | Example 14 | Example 15 | Example 16 |
|---|---|---|---|---|---|---|---|---|
| PP (E1) | 100 | 100 | 100 | 100 | 100 | 100 | 100 | 100 |
| Flame retardant (F3) | 15 | 15 | 15 | 15 | 0 | 0 | 0 | 0 |
| Flame retardant (F4) | 0 | 0 | 0 | 0 | 15 | 15 | 0 | 0 |
| Flame retardant (F5) | 0 | 0 | 0 | 0 | 0 | 0 | 15 | 15 |
| Flame retardant (F2) | 5 | 5 | 5 | 5 | 5 | 5 | 5 | 5 |
| Improver (G2) | 0 | 0 | 4.7 | 0 | 0 | 0 | 0 | 0 |
| Improver (G3) | 4.7 | 4.7 | 0 | 0 | 4.7 | 4.7 | 4.7 | 4.7 |
| Improver (G4) | 0 | 0 | 0 | 4.7 | 0 | 0 | 0 | 0 |
| Improver (H1) | 0.3 | 0 | 0.3 | 0.3 | 0.3 | 0 | 0.3 | 0 |
| Improver (H3) | 0 | 0.3 | 0 | 0 | 0 | 0.3 | 0 | 0.3 |
| Coloring agent | 1 | 1 | 1 | 1 | 1 | 1 | 1 | 1 |

TABLE 2-3-continued

| No. | Example 9 | Example 10 | Example 11 | Example 12 | Example 13 | Example 14 | Example 15 | Example 16 |
|---|---|---|---|---|---|---|---|---|
| Anti-bleeding property for a long period in a final product | ◎ | ◎ | ◎ | ◎ | ◎ | ◎ | ◎ | ◎ |
| Flame retardancy (V-0 test) | Qualified | Qualified | Qualified | Qualified | Qualified | Qualified | Qualified | Qualified |

It is to be noted that, in the Table 2-3 and Table 2-4, the flame retardant (F3) represents tris(tribromoneopentyl) phosphate, the flame retardant (F4) represents tris(2,3-dibromopropyl-1)isocyanurate, and the flame retardant (F5) represents decabromodiphenyl oxide.

Comparative Examples 7–14

The same procedures were followed as in the Example 1 except that the polyester resin (G) or the ester compound (H) was added as shown in the Table 2-4.

It is to be noted that the flame retardant (F) is 20.0 parts by weight based on 100 parts by weight of the thermoplastic resin (E), and a mixture composed of the polyester resin (G) and the polyester resin (H) is 25 parts by weight based on 100 parts by weight of the flame retardant (F).

pylene (E1) (a trade name: BC3 manufactured by Mitsubishi Kagaku, Ltd.) which is the thermoplastic resin (E), 15 parts by weight of 1-sulphonyl[3,5-dibromo-4-(2,3-dibromopropoxy)]benzene (F6) which is the flame retardant (F), 5 parts by weight of a variety of polyester resins (G1–G5) which are the polyester resin (G), 5 parts by weight of antimony trioxide which is an auxiliary agent for a flame retardant, and 1 part by weight of carbon black which is a coloring agent, followed by mixing for 1 minute.

It is to be noted that the flame retardant (including the auxiliary agent for a flame retardant) corresponds to 20.0 parts by weight based on 100 parts by weight of the thermoplastic resin (E), and the polyester resin (G) corresponds to 25.0 parts by weight based on 100 parts by weight of the flame retardant (F).

TABLE 2-4

| No. | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| PP (E1) | 100 | 100 | 100 | 100 | 100 | 100 | 100 | 100 |
| Flame retardant (F3) | 15 | 15 | 15 | 15 | 0 | 0 | 0 | 0 |
| Flame retardant (F4) | 0 | 0 | 0 | 0 | 15 | 15 | 0 | 0 |
| Flame retardant (F5) | 0 | 0 | 0 | 0 | 0 | 0 | 15 | 15 |
| Flame retardant (F2) | 5 | 5 | 5 | 5 | 5 | 5 | 5 | 5 |
| Improver (G2) | 3.0 | 0 | 4.7 | 0 | 0 | 0 | 0 | 0 |
| Improver (G3) | 0 | 4.7 | 0 | 0 | 4.7 | 4.7 | 4.7 | 4.7 |
| Improver (G4) | 0 | 0 | 0 | 4.7 | 0 | 0 | 0 | 0 |
| Improver (H1) | 2.0 | 0 | 0.3 | 0.3 | 0.3 | 0 | 0.3 | 0 |
| Improver (H3) | 0 | 0.3 | 0 | 0 | 0 | 0.3 | 0 | 0.3 |
| Color agent | 1 | 1 | 1 | 1 | 1 | 1 | 1 | 1 |
| Anti-bleeding property for a long period in a final product | × | × | × | × | × | × | × | × |
| Flame retardancy (V-0 test) | Qualified | Qualified | Qualified | Qualified | Qualified | Qualified | Qualified | Qualified |

As being distinct from the Table 2-1 to Table 2-4, it is understood that bleeding was not caused for a long period in molded articles obtained in the Examples 1–16 using the resin composition of the present invention, and those are excellent in flame retardancy.

In the Comparative Examples 1–3 and 7–14, it is understood that although products are excellent in flame retardancy, those are poor in bleeding for a long period. Further, in the Comparative Examples 4–6, those are poor in bleeding for a long period, and flame retardancy also lowers.

Examples and Comparative Examples of the No. II-2 Invention

Examples 17–24 and Comparative Examples 15–27

Examples 17–21

In Examples 17–21, as shown in the Table 2-5, a Henshel mixer was charged with 100 parts by weight of a polypro- Mixtures obtained were pelletized by melt mixing at processing temperature of 230° C. using a twin-screw extruder having screw diameter of 30 mm.

Comparative Example 15

The same procedures were followed as in the Example 17 except that the polyester resin (G) was not added.

Using pellets obtained in the respective Examples and Comparative Examples, test pieces having a fixed shape were prepared by an injection molding method at a resin temperature of 230° C. and a mold temperature of 50° C. to evaluate a long-term bleeding property and flame retardancy in products for a long period. Results are shown in Table 2-5.

TABLE 2-5

| No. | Example 17 | Example 18 | Example 19 | Example 20 | Example 21 | Comparative Example 15 |
|---|---|---|---|---|---|---|
| PP (E1) | 100 | 100 | 100 | 100 | 100 | 100 |
| Flame retardant (F6) | 15 | 15 | 15 | 15 | 15 | 15 |
| Improver (G4) | 5 | 0 | 0 | 0 | 0 | 0 |
| Improver (G1) | 0 | 5 | 0 | 0 | 0 | 0 |
| Improver (G2) | 0 | 0 | 5 | 0 | 0 | 0 |
| Improver (G3) | 0 | 0 | 0 | 5 | 0 | 0 |
| Improver (G5) | 0 | 0 | 0 | 0 | 5 | 0 |
| Auxiliary for a flame retardant | 5 | 5 | 5 | 5 | 5 | 5 |
| Coloring agent | 1 | 1 | 1 | 1 | 1 | 1 |
| Anti-bleeding property in a final product | ○ | ⊙ | ⊙ | ⊙ | ⊙ | × |
| Flame retardancy (V-0 test) | Qualified | Qualified | Qualified | Qualified | Qualified | Qualified |

It is to be noted that the polyester resin (G) is represented as an improver in the Table 2-5 to Table 2-13. Further, in the Table 2-5 to Table 2-13, the flame retardant (F6) represents 1-sulphonyl[3,5-dibromo-4-(2,3-dibromopropoxy)]benzene, the flame retardant (F1) represents tetrabromobisphenol-A-bis(dibromopropylether), the flame retardant (F3) represents tris(tribromoneopentyl)phosphate, the flame retardant (F4) represents tris(2,3-dibromopropyl-1)isocyanurate, and the flame retardant (F5) represents decabromodiphenyl oxide, the flame retardant (F7) represents a ammonium amide polyphosphate, the flame retardant (F8) represents melamine isocyanurate, the flame retardant (F9) represents a red phosphorus coated by a resin, the flame retardant (F10) represents triphenylphosphate, and the flame retardant (F11) represents ethylenebispentabromodiphenyl Likewise, in the Table 2-5 to Table 2-13, the improver (G4) represents PLACCEL H1P (a poly-ε-caprolactone having a number average molecular weight of 10,000 manufactured by Daicel Chemical Industries, Ltd.), the improver (G1) represents PLACCEL H4 (a poly-ε-caprolactone having a number average molecular weight of 40,000 manufactured by Daicel Chemical Industries, Ltd.), the improver (G2) represents PLACCEL H7 (a poly-ε-caprolactone having a number average molecular weight of 70,000 manufactured by Daicel Chemical Industries, Ltd.), the improver (G3) represents Bionolle 1003W (a succinic acid/1,4-butanediol-based polyester having a number average molecular weight of 43,000 manufactured by Showa Kobunshi, Ltd.), and the improver (G5) represents Pelplene S [a lactone-modified PBT manufactured by Toyobo, Ltd. (a terephthalic acid/1,4-butanediol/ε-caprolactone-based polyester having a number average molecular weight of 83,000)].

Examples 22–25 and Comparative Examples 16–17

The same procedures were followed as in the Example 17 except that tetrabromobisphenol-A-bis(dibromopropylether) was added in a fixed amount shown in the Table 2-6 as the flame retardant (F) to evaluate a bleeding property and flame retardancy in products.

Results are shown in Table 2-6.

It is to be noted that the f lame retardant (including an auxiliary for a flame retardant) is 21. 0 parts by weight based on 100 parts by weight of the thermoplastic resin (E) in the Examples 22–25, and polyester resin (G) is 33.3 parts by weight in the Examples 22–24 and 66.7 parts by weight in the Example 25 based on 100 parts by weight of the flame retardant (F).

In the Comparative Example 16, the flame retardant is 21.0 parts by weight based on 100 parts by weight of the thermoplastic resin (E) and the polyester resin (G) is not added, and, in the Comparative Example 17, the flame retardant (F) is 21.0 parts by weight and the polyester resin (G) is 238.1 parts by weight based on 100 parts by weight of the flame retardant (F).

TABLE 2-6

| No. | Example 22 | Example 23 | Example 24 | Example 25 | Comparative Example 16 | Comparative Example 17 |
|---|---|---|---|---|---|---|
| PP (E1) | 100 | 100 | 100 | 100 | 100 | 100 |
| Flame retardant (F1) | 14 | 14 | 14 | 14 | 14 | 14 |
| Improver (G4) | 7 | 0 | 0 | 0 | 0 | 0 |
| Improver (G1) | 0 | 7 | 0 | 0 | 0 | 0 |
| Tmprover (G2) | 0 | 0 | 7 | 14 | 0 | 50 |
| Auxiliary for a flame retardant | 7 | 7 | 7 | 7 | 7 | 7 |
| Coloring agent | 1 | 1 | 1 | 1 | 1 | 1 |
| Anti-bleeding property in a final product | ○ | ⊙ | ⊙ | ⊙ | × | Incapable of pelletizing |
| Flame retardancy (V-0 test) | Qualified | Qualified | Qualified | Qualified | Qualified | — |

Examples 26–28 and Comparative Examples 18–20

The same procedures were followed as in the Example 17 except that a variety of flame retardants (F) were employed as shown in Table 2-7, and a fixed amount of talc shown in Table 2-7 was optionally added as fillers to evaluate a bleeding property and flame retardancy in products. Preparation of test pieces is the same as in the Example 17. Results are shown in Table 2-7.

It is to be noted that the flame retardant is 20.0 parts by weight in the Examples 26–27 and 35.0 parts by weight in the Example 28 based on 100 parts by weight of the thermoplastic resin (E), and polyester resin (G) is 50.0 parts by weight in the Examples 26–27 and 28.6 parts by weight in the Example 28 based on 100 parts by weight of the flame retardant (F).

In the Comparative Examples 18–19, the flame retardant is 20.0 parts by weight based on 100 parts by weight of the thermoplastic resin (E) and, in the Comparative Example 20, the flame retardant is 35 parts by weight based on 100 parts by weight of the thermoplastic resin (E), and the polyester resin (G) was not added in all the Comparative Examples.

coated by a resin (F9) and 20 parts by weight of pyroline melamine (F12) as the flame retardant (F) and 2 parts by weight of carbon black as a coloring agent, further, 5 parts by weight of an improver (G2) in the Example 31 and 10 parts by weight of an improver (G2) in the Example 32, and processing temperature was changed to 220° C. to evaluate a bleeding property and flame retardancy in products.

It is to be noted that the flame retardant (F) is 30.0 parts by weight based on 100 parts by weight of the thermoplastic

TABLE 2-7

| No. | Example 26 | Comparative Example 18 | Example 27 | Comparative Example 19 | Example 28 | Comparative Example 20 |
|---|---|---|---|---|---|---|
| PP (E1) | 100 | 100 | 100 | 100 | 100 | 100 |
| Flame retardant (F3) | 15 | 15 | 0 | 0 | 0 | 0 |
| Flame retardant (F4) | 0 | 0 | 15 | 15 | 0 | 0 |
| Flame retardant (F5) | 0 | 0 | 0 | 0 | 30 | 30 |
| Improver (G2) | 10 | 0 | 10 | 0 | 10 | 0 |
| Auxiliary for a flame retardant | 5 | 5 | 5 | 5 | 5 | 5 |
| Coloring agent | 2 | 2 | 2 | 2 | 2 | 2 |
| Filler | 0 | 0 | 0 | 0 | 25 | 25 |
| Anti-bleeding property in a final product | ⊚ | × | ⊚ | × | ⊚ | × |
| Flame retardancy (V-0 test) | Qualified | Qualified | Qualified | Qualified | Qualified | Qualified |

Examples 29–30 and Comparative Example 21

The same procedures were followed as in the Example 17 except that as shown in Table 2-8, there were employed 100 parts by weight of a polypropylene (E2) (a trade name: Sumitomo Noblen "D501" manufactured by Sumitomo Kagaku Kogyo, Ltd.) as the thermoplastic resin (E), and 14 parts by weight of ammonium amide polyphosphate (F7) and 7 parts by weight of melamine cyanurate (F8) as the flame retardant (F) and 2 parts by weight of carbon black as a coloring agent in a fixed amount shown in Table 2-8, and processing temperature was changed to 200° C. to evaluate a bleeding property and flame retardancy in products.

It is to be noted that the flame retardant (F) is 21.0 parts by weight based on 100 parts by weight of the thermoplastic resin (E), and polyester resin (G) is 23.8 parts by weight in the Example 29 and 47.6 parts by weight in the Example 30 based on 100 parts by weight of the flame retardant (F). In the Comparative Example 21, the flame retardant (F) is 20.0 parts by weight based on 100 parts by weight of the thermoplastic resin (E) and, the polyester resin (G) was not added.

TABLE 2-8

| No. | Example 29 | Example 30 | Comparative Example 21 |
|---|---|---|---|
| PP (E2) | 100 | 100 | 100 |
| Flame retardant (F7) | 14 | 14 | 14 |
| Flame retardant (F8) | 7 | 7 | 7 |
| Improver (G2) | 5 | 10 | 0 |
| Coloring agent | 2 | 2 | 2 |
| Anti-bleeding property in a final product | ⊚ | ⊚ | × |
| Flame retardancy (V-0 test) | Qualified | Qualified | Qualified |

Examples 31–32 and Comparative Example 22

The same procedures were followed as in the Example 17 except that as shown in Table 2-9, there were formulated 100 parts by weight of a polystyrene (E3) (a trade name: HT-88 manufactured by Mitsubishi Kagaku, Ltd.) as the thermoplastic resin (E), and 10 parts by weight of a red phosphorus resin (E), and polyester resin (G) is 16.7 parts by weight in the Example. 31 and 33.3 parts by weight in the Example 32 based on 100 parts by weight of the flame retardant (F).

In the Comparative Example 22, the flame retardant (F) is 30.0 parts by weight based on 100 parts by weight of the thermoplastic resin (E) and, the polyester resin (G) was not added.

TABLE 2-9

| No. | Example 31 | Example 32 | Comparative Example 22 |
|---|---|---|---|
| PS (E3) | 100 | 100 | 100 |
| Flame retardant (F9) | 10 | 10 | 10 |
| Flame retardant (F12) | 20 | 20 | 20 |
| Improver (G2) | 5 | 10 | 0 |
| Coloring agent | 2 | 2 | 2 |
| Anti-bleeding property in a final product | ⊚ | ⊚ | × |
| Flame retardancy (V-0 test) | Qualified | Qualified | Qualified |

Examples 33–34 and Comparative Example 23

The same procedures were followed as in the Example 17 except that as shown in Table 2-10, there were formulated 70 parts by weight of a polycarbonate (E4) (a trade name: Yupilon S-2000 manufactured by Mitsubishi Engineering Plastics, Ltd.) and an ABS resin (E5) (a trade name: Taflex 21 manufactured by Mitsubishi Kagaku, Ltd.) as the thermoplastic resin (E), and 15 parts by weight of triphenylphosphate (F10) as the flame retardant (F), and 2 parts by weight of carbon black as a coloring agent, further, 10 parts by weight of an improver (G2) in the Example 33 and 10 parts by weight of an improver (G2) in the Example 34, and processing temperature was changed to 270° C. to evaluate a bleeding property and flame retardancy in products.

It is to be noted that the flame retardant (F) is 15.0 parts by weight based on 100 parts by weight of the thermoplastic resin (E), and polyester resin (G) is 33.3 parts by weight in the Example 33 and 66.7 parts by weight in the Example 34 based on 100 parts by weight of the flame retardant (F).

In the Comparative Example 23, the flame retardant (F) is 15.0 parts by weight based on 100 parts by weight of the thermoplastic resin (E) and, the polyester resin (G) was not added.

TABLE 2-10

| No. | Example 33 | Example 34 | Comparative Example 23 |
|---|---|---|---|
| PC (E4) | 70 | 70 | 70 |
| ABS (E5) | 30 | 30 | 30 |
| Flame retardant (F10) | 15 | 15 | 15 |
| Improver (G2) | 5 | 10 | 0 |
| Coloring agent | 2 | 2 | 2 |
| Anti-bleeding property in a final product | ⊚ | ⊚ | x |
| Flame retardancy (V-0 test) | Qualified | Qualified | Qualified |

Examples 35–36 and Comparative Example 24

The same procedures were followed as in the Example 17 except that as shown in Table 2-11, there were formulated 25 parts by weight of a polystyrene (E3) (a trade name: HT-88 manufactured by Mitsubishi Kagaku, Ltd.) and a polyphenylene ether (E6) (a trade name: Zailon 200H manufactured by Asahi Kasei Kogyo, Ltd.) as the thermoplastic resin (E), and 21 parts by weight of triphenylphosphate (F10) and 9 parts by weight of melamine isocyanurate as the flame retardant (F), and 2 parts by weight of carbon black as a coloring agent and, further, 5 parts by weight of an improver (G2) in the Example 35 and 10 parts by weight of an improver (G2) in the Example 36, and processing temperature was changed to 250° C. to evaluate a bleeding property and flame retardancy in products.

It is to be noted that the flame retardant (F) is 30.0 parts by weight based on 100 parts by weight of the thermoplastic resin (E), and polyester resin (G) is 16.7 parts by weight in the Example 35 and 33.3 parts by weight in the Example 36 based on 100 parts by weight of the flame retardant (F).

In the Comparative Example 24, the flame retardant (F) is 30.0 parts by weight based on 100 parts by weight of the thermoplastic resin (E) and, the polyester resin (G) was not added.

TABLE 2-11

| No. | Example 35 | Example 36 | Comparative Example 24 |
|---|---|---|---|
| PS (E3) | 75 | 75 | 75 |
| PPE (E6) | 25 | 25 | 25 |
| Flame retardant (F8) | 9 | 9 | 9 |
| Flame retardant (F10) | 21 | 21 | 21 |
| Improver (G2) | 5 | 10 | 0 |
| Coloring agent | 2 | 2 | 2 |

TABLE 2-11-continued

| No. | Example 35 | Example 36 | Comparative Example 24 |
|---|---|---|---|
| Anti-bleeding property in a final product | ⊚ | ⊚ | x |
| Flame retardancy (V-0 test) | Qualified | Qualified | Qualified |

Examples 37–40 and Comparative Examples 25–26

The same procedures were followed as in the Example 17 except that as shown in Table 2-12, there were formulated 70 parts by weight of a polybutylene terephthalate (E7) (a trade name: Novadol 5010R-5 manufactured by Mitsubishi Engineering Plastics, Ltd.) as the thermoplastic resin (E), and 12 parts by weight of decabromodiphenyl oxide (F5) or 12 parts by weight of ethylenebispentabromodiphenyl (F11) (Saytex 8010 manufactured by Albemal) as the flame retardant (F), 6 parts by weight of antimony trioxide as an auxiliary agent for a flame retardant, 30 parts by weight of glass fibers as fillers, and 2 parts by weight of carbon black as a coloring agent and, further, 5 parts by weight of an improver (G2) in the Examples 37 and 39, and 10 parts by weight of an improver (G2) in the Examples 38 and 40, and processing temperature was changed to 280° C. to evaluate a bleeding property and flame retardancy in products.

It is to be noted that the flame retardant is 25.7 parts by weight based on 100 parts by weight of the thermoplastic resin (E), and polyester resin (G) is 27.8 parts by weight in the Examples 37 and 39, and 55.6 parts by weight in the Examples 38 and 40 based on 100 parts by weight of the flame retardant (F).

In the Comparative Examples 25 and 26, the flame retardant (F) is 25.7 parts by weight based on 100 parts by weight of the thermoplastic resin (E) and, the polyester resin (G) was not added.

TABLE 2-12

| No. | Example 37 | Example 38 | Comparative Example 25 | Example 39 | Example 40 | Comparative Example 26 |
|---|---|---|---|---|---|---|
| PBT (E7) | 70 | 70 | 70 | 70 | 70 | 70 |
| Flame retardant (F5) | 12 | 12 | 12 | 0 | 0 | 0 |
| Flame retardant (F11) | 0 | 0 | 0 | 12 | 12 | 12 |
| Improver (G2) | 5 | 10 | 0 | 5 | 10 | 0 |
| Auxiliary for a flame retardant | 6 | 6 | 6 | 6 | 6 | 6 |
| Coloring agent | 2 | 2 | 2 | 2 | 2 | 2 |
| Filler | 30 | 30 | 30 | 30 | 30 | 30 |
| Anti-bleeding property in a final product | ⊚ | ⊚ | x | ⊚ | ⊚ | x |
| Flame retardancy (V-0 test) | Qualified | Qualified | Qualified | Qualified | Qualified | Qualified |

Examples 41–42 and Comparative Example 27

The same procedures were followed as in the Example 17 except that as shown in Table 2-13, there were formulated 100 parts by weight of a polyamide (E8) (a trade name: Amilane CM-1007 manufactured by Toray) as the thermoplastic resin (E), and 5 parts by weight of a red phosphorus coated by a resin (F9) as the flame retardant (F), and 2 parts by weight of carbon black as a coloring agent and, further, 2 parts by weight of an improver (G2) in the Examples 41, and 5 parts by weight of an improver (G2) in the Example 42, and processing temperature was changed to 250° C. to evaluate a bleeding property and flame retardancy in products.

It is to be noted that the flame retardant (F) is 5.0 parts by weight based on 100 parts by weight of the thermoplastic resin (E), and polyester resin (G) is 40.0 parts by weight in the Example 41, and 100.0 parts by weight in the Example 42 based on 100 parts by weight of the flame retardant (F).

In the Comparative Example 27, the flame retardant (F) is 5.0 parts by weight based on 100 parts by weight of the thermoplastic resin (E) and, the polyester resin (G) was not added.

TABLE 2-13

| No. | Example 41 | Example 42 | Comparative Example 27 |
|---|---|---|---|
| PA (E8) | 100 | 100 | 100 |
| Flame retardant (F9) | 5 | 5 | 5 |
| Improver (G2) | 2 | 5 | 0 |
| Coloring agent | 2 | 2 | 2 |
| Anti-bleeding property in a final product | ⊚ | ⊚ | x |
| Flame retardancy (V-0 test) | Qualified | Qualified | Qualified |

As being distinct from the Table 2-5 to Table 2-13, bleeding was not observed in molded articles obtained in the Examples 17–42 using the resin composition of the present invention, and it is confirmed that those are excellent in flame retardancy. It is confirmed that although those are excellent in flame retardancy, those are poor in bleeding property in the Comparative Examples 15–16 and 18–27. Further, in the Comparative Example 17, pelletizing was not able to be conducted, and a product was not able to be molded.

Examples and Comparative Examples of the No. II-3 invention Examples 43–57 and Comparative Examples 28–33

Examples 43–47

In Examples 43–47, as shown in the Table 2-14 described hereinafter, a Henshel mixer (a trade name) was charged with 95 parts by weight of a polypropylene (P1) (a trade name: BC3 manufactured by Mitsubishi Kagaku, Ltd., which is the same as in the E1) as a polyolefin resin (P), 1.5 part by weight of ethylenebispentabromodiphenyl (FD1) (the same as in the F11) and 1.5 part by weight of 1-sulphonyl[3,5-dibromo-4-(2,3-dibromopropoxy)]benzene (the same as in the F6), 2.0 parts by weight of a variety of polyester resins (G1–G5) as the polyester resins (G), 1.5 part by weight of antimony trioxide (the same as in the F2) which is an auxiliary agent for a flame retardant, and 1.0 part by weight of carbon black which is a coloring agent, followed by mixing for 1 minute.

It is to be noted that the halogen-based flame retardant (FD) corresponds to 3.16 parts by weight based on 100 parts by weight of the polyolefin resin (P), and the polyester resin (G) corresponds to 2.04 parts by weight based on 100 parts by weight of total of the (P) and (FD).

Mixtures obtained were pelletized by melt mixing at a processing temperature of 230° C. using a twin-screw extruder having screw diameter of 37 mm.

Comparative Example 28

The same procedures were followed as in the Example 43 except that the polyester resin (G) was not added.

Using pellets obtained in the respective Examples and Comparative Examples, test pieces having a fixed shape were molded at a resin temperature of 230° C. and a mold temperature of 50° C. by an injection molding method to evaluate a bleeding property and flame retardancy in products. Results are shown in Table 2-14.

TABLE 2-14

| | Examples | | | | | Comparative Example |
|---|---|---|---|---|---|---|
| No. | 43 | 44 | 45 | 46 | 47 | 28 |
| PP (P1) | 95 | 95 | 95 | 95 | 95 | 95 |
| Flame retardant (FD1) | 1.5 | 1.5 | 1.5 | 1.5 | 1.5 | 1.5 |
| Flame retardant (FD2) | 1.5 | 1.5 | 1.5 | 1.5 | 1.5 | 1.5 |
| Improver (G4) | 2.0 | 0 | 0 | 0 | 0 | 0 |
| Improver (G1) | 0 | 2.0 | 0 | 0 | 0 | 0 |
| Improver (G2) | 0 | 0 | 2.0 | 0 | 0 | 0 |
| Improver (G3) | 0 | 0 | 0 | 2.0 | 0 | 0 |
| Improver (G5) | 0 | 0 | 0 | 0 | 2.0 | 0 |
| Auxiliary for a flame retardant (I1) | 1.0 | 1.0 | 1.0 | 1.0 | 1.0 | 1.0 |
| Coloring agent | 1.0 | 1.0 | 1.0 | 1.0 | 1.0 | 1.0 |
| Anti-bleeding property in a final product | Excellent | Excellent | Excellent | Excellent | Excellent | Worse |
| Flame retardancy (V-2 test) | Qualified | Qualified | Qualified | Qualified | Qualified | Qualified |

Note) Flame retardant (FD1)=ethylenebispentabromodiphenyl

Flame retardant (FD2)=1,1-sulphonyl[3,5-dibromo-4-(2,3-dibromopropoxy)]benzene

In the Table, the polyester resin (G) is referred to the improver (G).

Improver (G4)=PLACCEL H1P (a poly-ε-caprolactone having a number molecular weight of 10,000 manufactured by Daicel Chemical Industries)

Improver (G1)=PLACCEL H4 (a poly-ε-caprolactone having a number molecular weight of 40,000 manufactured by Daicel Chemical Industries)

Improver (G2)=PLACCEL H7 (a poly-ε-caprolactone having a number molecular weight of 70,000 manufactured by Daicel Chemical Industries)

Improver (G3)=Bionolle 1003W (a succinic acid/1,4-butane diol-based polyester having a number molecular weight of 43,000 manufactured by Showa Kobunshi)

Improver (G5)=Pelplene S (a terephthalic acid/1,4-butane diol/ε-caprolactone-based polyester having a number molecular weight of 83,000 manufactured by Toyobo)

Examples 48–51 and Comparative Examples 29–30

The same procedures were followed as in the Example 43 except that 1,1-sulphonyl[3,5-dibromo-4-(2,3-dibromopropoxy)]benzene (FD2) (the same as in the F6) was employed at a fixed amount shown in the Table 2-15 as a halogen-based flame retardant (FD) to evaluate a bleeding property and flame retardancy in products.
Results are shown in Table 2-15.

It is to be noted that the halogen-based flame retardant (FD) corresponds to 19.0 parts by weight based on 100 parts by weight of the polyolef in resin (P) in the Examples 48–51, and the polyester resin (G) corresponds to 5.3 parts by weight in the Examples 48–50 and 10.6 parts by weight in the Example 51 based on 100 parts by weight of total of the (P) and (FD). In the Comparative Example 29, the polyester resin (G) is not added. In the Comparative Example 30, the halogen-based flame retardant (FD) corresponds to 19.0 parts by weight based on 100 parts by weight of the polyolefin resin (P), and the polyester resin (G) corresponds to 37.2 parts by weight based on 100 parts by weight of total of the (P) and (FD).

Improver (G1)=PLACCEL H4 (a poly-ε-caprolactone having a number molecular weight of 40,000 manufactured by Daicel Chemical Industries)

Improver (G2)=PLACCEL H7 (a poly-ε-caprolactone having a number molecular weight of 100,000 manufactured by Daicel Chemical Industries)

Examples 52–55 and Comparative Examples 31–32

The same procedures were followed as in the Example 43 except that tetrabromobisphenol-A-bis(2,3-dibromopropylether) (FD3) (the same as in the F1) was employed at a fixed amount shown in the Table 2-16 as a halogen-based flame retardant (FD) to evaluate a bleeding property and flame retardancy in products. Results are shown in Table 2-16.

It is to be noted that the halogen-based flame retardant (FD) corresponds to 17.9 parts by weight based on 100 parts by weight of the polyolefin resin (P) in the Examples 52–55, and the polyester resin (G) corresponds to 5.4 parts by weight in the Examples 52–54 and 10.9 parts by weight in the Example 55 based on 100 parts by weight of total of the (P) and (FD).

TABLE 2-15

| No. | Example 48 | Example 49 | Example 50 | Example 51 | Comparative Example 29 | Comparative Example 30 |
|---|---|---|---|---|---|---|
| PP (P1) | 79 | 79 | 79 | 79 | 79 | 79 |
| Flame retardant (FD2) | 15 | 15 | 15 | 15 | 15 | 15 |
| Improver (G4) | 5 | 0 | 0 | 0 | 0 | 0 |
| Improver (G1) | 0 | 5 | 0 | 0 | 0 | 0 |
| Improver (G2) | 0 | 0 | 5 | 10 | 0 | 35 |
| Auxiliary for a flame retardant (I1) | 5 | 5 | 5 | 5 | 5 | 5 |
| Coloring agent | 1 | 1 | 1 | 1 | 1 | 1 |
| Anti-bleeding property in a final product | Excellent | Excellent | Excellent | Excellent | Worse | Incapable of pelletizing |
| Flame retardancy (V-0 test) | Qualified | Qualified | Qualified | Qualified | Qualified | — |

Note) Flame retardant (FD2)=1,1-sulphonyl[3,5-dibromo-4-(2,3-dibromopropoxy)]benzene In the Table, the polyester resin (G) is referred to the improver (G).

Improver (G4)=PLACCEL H1P (a poly-ε-caprolactone having a number molecular weight of 10,000 manufactured by Daicel Chemical Industries)

In the Comparative Example 31, the polyester resin (G) is not added.

In the Comparative Example 32, the halogen-based flame retardant (FD) corresponds to 17.9 parts by weight based on 100 parts by weight of the polyolefin resin (P), and the polyester resin (G) corresponds to 38.0 parts by weight based on 100 parts by weight of total of the (P) and (FD).

TABLE 2-16

| No. | Example 52 | Example 53 | Example 54 | Example 55 | Comparative Example 31 | Comparative Example 32 |
|---|---|---|---|---|---|---|
| PP (P1) | 78 | 78 | 78 | 78 | 78 | 78 |
| Flame retardant (FD3) | 14 | 14 | 14 | 14 | 14 | 14 |
| Improver (G4) | 5 | 0 | 0 | 0 | 0 | 0 |
| Improver (G1) | 0 | 5 | 0 | 0 | 0 | 0 |
| Improver (G2) | 0 | 0 | 5 | 10 | 0 | 35 |
| Auxiliary for a flame retardant (I1) | 7 | 7 | 7 | 7 | 7 | 7 |
| Coloring agent | 1 | 1 | 1 | 1 | 1 | 1 |
| Anti-bleeding property in a final product | Excellent | Excellent | Excellent | Excellent | Worse | Incapable of pelletizing |
| Flame retardancy (V-0 test) | Qualified | Qualified | Qualified | Qualified | Qualified | — |

Note) Flame retardant (FD3)=tetrabromobisphenol-A-bis(2,3-dibromopropylether)

In the Table, the polyester resin (G) is referred to the improver (G).

Improver (G4)=PLACCEL H1P (a poly-ε-caprolactone having a number molecular weight of 10,000 manufactured by Daicel Chemical Industries)

Improver (G1)=PLACCEL H4 (a poly-ε-caprolactone having a number molecular weight of 40,000 manufactured by Daicel Chemical Industries)

Improver (G2)=PLACCEL H7 (a poly-ε-caprolactone having a number molecular weight of 100,000 manufactured by Daicel Chemical Industries)

Examples 56–57 and Comparative Example 33

PLACCEL H7 which is the improver (G2) was formulated with 100 parts by weight of a polypropylene (P1) (a trade name: BC3 manufactured by Mitsubishi Kagaku, Ltd., which is the same as in the E1), 5 parts by weight of antimony trioxide (I1) (the same as in the F2) as an auxiliary agent for a flame retardant, and 2 parts by weight of carbon black in 0 part by weight (Comparative Example 33), 5 parts by weight (Example 56), or 10 parts by weight (Example 57), respectively, to evaluate a bleeding property after molding and an acceleration test in relation to a variety of flame retardants. Test pieces were prepared by the same method as in the Example 43. Results are shown in Table 2-17. It is to be noted that the halogen-based flame retardant (FD) corresponds to 10 parts by weight based on 100 parts by weight of the polyolefin resin (P) in the Examples 56–57, and the polyester resin (G) corresponds to 4.5 parts by weight in the Example 56 and 9.1 parts by weight in the Example 57 based on 100 parts by weight of total of the (P) and (FD). In the Comparative Example 33, the polyester resin (G) is not added.

obtained in the Examples 43–57 using the resin composition of the present invention, and those are excellent in flame retardancy.

It is confirmed that in the Comparative Examples 28, 29, and 31, although those are excellent in flame retardancy, those are poor in a bleeding property. Further, in the Comparative Examples 30 and 32, pelletizing was not able to be conducted, and a product was not able to be molded.

Examples and Comparative Examples of the No. II-4 Invention (Examples 58–64 and Comparative Examples 34–37)

Examples 58–60

In Examples 58–60, as shown in the Table 2-18, a Henshel mixer (a trade name: Henshel mixer manufactured by Kawata) was charged with 95 parts by weight of a polypropylene (E1) (a trade name: BC3 manufactured by Mitsubishi Kagaku, Ltd., which is the same as in the P1) as a thermoplastic resin (E), 3 parts by weight of tetrabromobisphenol-A-bis(2,3-dibromopropylether) (F1), 1 part by weight of a commercially-supplied glycerine fatty acid ester or polyglycerine fatty acid ester (H3, H4, and H7) as an ester compound (H), 1 part by weight of antimony trioxide as an auxiliary agent for a flame retardant, and 1 part by weight of carbon black as a coloring agent, followed by mixing for 1 minute.

It is to be noted that the flame retardant (including the auxiliary agent for a flame retardant) corresponds to 4.21 parts by weight based on 100 parts by weight of the thermoplastic resin (E), and the ester compound (H) corresponds to 25 parts by weight based on 100 parts by weight of the flame retardant. Mixtures obtained were pelletized by melt mixing at a processing temperature of 230° C. using a twin-screw extruder having screw diameter of 30 mm.

Comparative Examples 34–35

As shown in the Table 2-18, the same procedures were likewise followed as in the Example 58 except that the ester

TABLE 2-17

|  | After molding | | | Accelerator test | | |
| --- | --- | --- | --- | --- | --- | --- |
|  | Comparative Example | Examples | | Comparative Example | Examples | |
|  | 33 | 56 | 57 | 33 | 56 | 57 |
|  | Addition amount of the improver (G2) | | | | | |
| Flame retardant (F) | 0 part | 5 parts | 10 parts | 0 part | 5 parts | 10 parts |
| TBA-bis(2,3-dibromopropyl ether) (F1) | x | ○ | ○ | x | ○ | ○ |
| Tris(2,3-dibromopropyl-1)isocyanurate (F4) | Δ | ○ | ○ | x | ○ | ○ |
| 1,1-sulphonyl[3,5-dibromo-4-(2,3-dibromopropoxy)]benzene (F6) | ○ | ○ | ○ | x | ○ | ○ |
| Tris(tribromoneopentyl)phosphate (F3) | ○ | ○ | ○ | x | ○ | ○ |
| Decabromodiphenyl oxide (F5) | ○ | ○ | ○ | x | ○ | ○ |
| Perchlorocyclopentadecane | ○ | ○ | ○ | x | ○ | ○ |
| Ethylenebis-tetrabromo phthalic imide | ○ | ○ | ○ | Δ | ○ | ○ |
| Ethylenebispentabromodiphenyl (FD1) | ○ | ○ | ○ | x | ○ | ○ |
| Octabromotrimethyl phenyl indane | Δ | Δ | ○ | x | Δ | ○ |
| Hexabromocyclododecane | x | ○ | ○ | x | ○ | ○ |

Accelerator Test 80° C.×24 Hours

Evaluation of Bleeding

○ No bleeding

Δ Slightly bleeding

X Bleeding

As being distinct from the Table 2-14 to Table 2-17, it is confirmed that bleeding was not observed in molded articles compound (H) was not added in the Comparative Examples 34, and the ester compound (H) was changed to 15 parts by weight in the Comparative Examples 35 to evaluate a bleeding property and flame retardancy in products. Results are shown in Table 2-18.

It is to be noted that in the Comparative Examples 34, the flame retardant (including the auxiliary agent for a flame retardant) corresponds to 4.21 parts by weight based on 100 parts by weight of the thermoplastic resin (E), and the ester compound (H) was not added.

It is to be noted that in the Comparative Examples 35, the flame retardant corresponds to 4.21 parts by weight based on 100 parts by weight of the thermoplastic resin (E), and the ester compound (H) corresponds to 375 parts by weight based on 100 parts by weight of the flame retardant (F).

Using pellets obtained in the respective Examples and Comparative Examples, test pieces having a fixed shape were molded at a resin temperature of 230° C. and a mold temperature of 50° C. by an injection molding method to evaluate a bleeding property and flame retardancy in products. Results are shown in Table 2-18.

property and flame retardancy in products. Results are shown in Table 2-19. It is to be noted that the flame retardant (F) corresponds to 4.21 parts by weight based on 100 parts by weight of the thermoplastic resin (E), and the ester compound (H) corresponds to 25 parts by weight based on 100 parts by weight of total of the flame retardant (F).

Comparative Examples 36–37

As shown in Table 2-19, the same procedures were followed as in the Example 58 except that the ester compound (H) was not added in the Comparative Example 36, and the ester compound (H) was changed to 15 parts by weight in the Comparative Example 37 to evaluate a bleeding property and flame retardancy in products.

TABLE 2-18

| No. | Example 58 | Example 59 | Example 60 | Comparative Example 34 | Comparative Example 35 |
|---|---|---|---|---|---|
| PP (E1) | 95 | 95 | 95 | 95 | 95 |
| Flame retardant (F1) | 3 | 3 | 3 | 3 | 3 |
| Improver (H4) | 1 | 0 | 0 | 0 | 15 |
| Improver (H7) | 0 | 1 | 0 | 0 | 0 |
| Improver (H3) | 0 | 0 | 1 | 0 | 0 |
| Auxiliary for a flame retardant (I1) | 1 | 1 | 1 | 1 | 1 |
| Coloring agent | 1 | 1 | 1 | 1 | 1 |
| Anti-bleeding property in a final product | Excellent | Excellent | Excellent | Worse | Incapable of pelletizing |
| Flame retardancy (V-2 test) | Qualified | Qualified | Qualified | Qualified | — |

It is to be noted that in the Table 2-18 and Table 2-19, an ester compound is referred to as an improver. Further, in the Table 2-18, the flame retardant (F1) represents tetrabromobisphenol-A-bis (2,3-dibromopropylether), the improver (H4) represents stearic acid monoglyceride (a trade name: Sunsoft No. 8000 manufactured by Taiyo Kagaku, Ltd.), the improver (H7) represents behenic acid monoglyceride (a trade name: Sunsoft No. 8100 manufactured by Taiyo Kagaku, Ltd.), and the improver (H3) represents 12-hydroxystearic acid triglyceride (a trade name: K-3 Wax manufactured by Kawaken Fine Chemical, Ltd.).

Examples 61–64

The same procedures were followed as in the Example 58 except that tetrabromobisphenol-A-bis(2,3-dibromopropylether) (F1) was employed as a flame retardant (F), commercially-supplied polyglycerine fatty acid esters (H1, H2, H5, and H6) were employed as an ester compound (H), and a fixed amount was employed in a fixed amount shown in Table 2-19, respectively, to evaluate a bleeding Results are shown in Table 2-19.

It is to be noted that in the Comparative Example 36, the flame retardant (F) corresponds to 4.21 parts by weight based on 100 parts by weight of the thermoplastic resin (E), and the ester compound (H) was not added.

In the Comparative Example 37, the flame retardant (F) corresponds to 4.21 parts by weight based on 100 parts by weight of the thermoplastic resin (E), and the ester compound (H) corresponds to 375 parts by weight based on 100 parts by weight of the flame retardant (F).

TABLE 19

| No. | Example 61 | Example 62 | Example 63 | Example 64 | Comparative Example 36 | Comparative Example 37 |
|---|---|---|---|---|---|---|
| PP (E1) | 95 | 95 | 95 | 95 | 95 | 95 |
| Flame retardant (F1) | 3 | 3 | 3 | 3 | 3 | 3 |
| Improver (H2) | 1 | 0 | 0 | 0 | 0 | 15 |
| Improver (H1) | 0 | 1 | 0 | 0 | 0 | 0 |
| Improver (H5) | 0 | 0 | 1 | 0 | 0 | 0 |
| Improver (H6) | 0 | 0 | 0 | 1 | 0 | 0 |
| Auxiliary for a flame retardant (I1) | 1 | 1 | 1 | 1 | 1 | 1 |
| Coloring agent | 1 | 1 | 1 | 1 | 1 | 1 |
| Anti-bleeding property in a final product | Excellent | Excellent | Excellent | Excellent | Worse | Incapable pelletizing |
| Flame retardancy (V-2 test) | Qualified | Qualified | Qualified | Qualified | Qualified | — |

It is to be noted that in the Table 2-19, the flame retardant (F1) represents tetrabromobisphenol-A-bis(2,3-dibromopropylether), the improver (H2) represents a diglycerine stearate (a trade name: Rikemal S-71-D manufactured by Riken Vitanine, Ltd.), the improver (H1) represents a hexaglycerine pentastearate (a trade name: SY Glystar-PS-500 manufactured by Sakamoto Yakuhin Kogyo, Ltd.), the improver (H5) represents a decaglycerine monostearate (a trade name: SY Glystar-MS-750 manufactured by Sakamoto Yakuhin Kogyo, Ltd.), and the improver (H6) represents a decaglycerine decastearate (a trade name: SY Glystar-DAS-750 manufactured by Sakamoto Yakuhin Kogyo, Ltd.).

As being distinct from the Tables 2-18 and 2-19, it is confirmed that bleeding was not observed in molded articles obtained in the Examples 58–64 using the resin composition of the present invention, and those are excellent in flame retardancy.

It is confirmed that in the Comparative Examples 34 and 36, although those are excellent in flame retardancy, those are poor in bleeding property. Further, in the Comparative Examples 35 and 37, pelletizing was not able to be conducted, and a product was not able to be molded.

POSSIBILITY OF UTILIZATION IN INDUSTRY

According to the No. I invention, pelletizing and injection molding are possible in the regenerated PET resin, and there can be obtained a regenerated PET resin composition and a molded article therefrom which have an excellent mechanical strength.

According to the No.II invention, there can be obtained a flame retardant polyolefin resin composition and a molded article therefrom in which bleeding of a flame retardant is suppressed without a decline of a flame retardancy.

What is claimed is:

1. A regenerated PET resin composition which comprises 100 parts by weight of a regenerated PET resin (A) and 0.5–100 parts by weight of a lactone polymer (B).

2. A regenerated PET resin composition as claimed in claim 1, wherein it further contains a polyolefin resin (C).

3. A regenerated PET resin composition as claimed in claim 1 or 2, wherein it further contains other additives (D) which are an inorganic compound or an organic compound.

4. A regenerated resin molded article formed by molding the regenerated PET resin composition as claimed in claims 1 or 2.

5. A flame retardant resin composition comprising 100 parts by weight of a thermoplastic resin (E) and 0.5–100 parts by weight of a flame retardant (F) in which 1–200 parts by weight of a mixture composed of a polyester resin (G) and an ester compound (H) of a polyglycerine or glycerine with a higher fatty acid is formulated with 100 parts by weight of a flame retardant (F).

6. A flame retardant resin composition as claimed in claim 5, wherein it contains an additive (I) composed of at least any one of an inorganic compound, an organic compound, or other additives for resins.

7. A flame retardant resin composition as claimed in claim 5 or 6, wherein a mixing weight ratio is (G):(H)= 85–99.5:0.5–15 (total of both weight ratio is 100) in a mixture composed of the polyester resin (G) and the ester compound (H) of a polyglycerine or glycerine with a higher fatty acid.

8. A flame retardant resin composition as claimed in claim 7, wherein said flame retardant (F) is at least any one kind of a bromine-based flame retardant, a chlorine-based flame retardant, a phosphorus-based flame retardant, a phosphate-based flame retardant, a polyphosphoric acid-based flame retardant, a nitrogen compound-based flame retardant, or an inorganic-based flame retardant.

9. A flame retardant resin composition as claimed in claim 8, wherein said polyester resin (G) is an automatic or aliphatic polyester resin.

10. A flame retardant resin composition as claimed in claim 9, wherein said aliphatic polyester resin is a lactone polymer (B).

11. A flame retardant resin composition as claimed in claim 10, wherein said ester compound (H) is at least any one of a monoglyceride, diglyceride, triglyceride, a diglycerine fatty acid ester, a triglycerine fatty acid ester, a tetraglycerine fatty acid ester, a pentaglycerine fatty acid ester, a hexaglycerine fatty acid ester and a deglycerine fatty acid ester.

12. A flame retardant resin molded article formed by molding the flame retardant resin compositions as claimed in claims 5 or 11.

13. A flame retardant resin composition comprising 100 parts by weight of a thermoplastic resin (E) and 0.5–100 parts by weight of a flame retardant, wherein 1–200 parts by weight of a polyester resin (G) is formulated with 100 parts by weight of the flame retardant (F).

14. A flame retardant resin composition as claimed in claim 13 which comprises formulating an additive (I) composed of at least any one of inorganic or organic compound, or other additives for resins.

15. A flame retardant resin composition as claimed in claim 13 or 14, wherein said flame retardant (F) is at least any one kind of a bromine-based flame retardant, a chlorine-based flame retardant, a phosphorus-based flame retardant, a phosphate-based flame retardant, a polyphosphoric acid-based flame retardant, a nitrogen compound-based flame retardant, or an inorganic-based flame retardant.

16. A flame retardant resin composition as claimed in claim 13 or 14, wherein said polyester resin (G) is an aromatic or aliphatic polyester resin.

17. A flame retardant resin composition as claimed in claim 16, wherein said aliphatic polyester resin is a lactone polymer (B).

18. A flame retardant resin molded article formed by molding the flame retardant resin composition as claimed in claims 13 or 14.

19. A flame retardant polyolefin resin composition comprising 1–30 parts by weight of a polyester resin (G) formulated with 100 parts by weight of a resin composition composed of 100 parts by weight of a polyolefin resin (P) and 0.2–40 parts by weight of a halogen-based flame retardant (FD).

20. A flame retardant polyolefin resin composition as claimed in claim 19, wherein it further contains other additives (I) composed of at least any one of inorganic or organic compound, or other additives for resins.

21. A flame retardant polylefin resin composition as claimed in claim 19, wherein said halogen-based flame retardant (FD) is a halogen-containing organic compound.

22. A flame retardant polylefin resin composition as claimed in claim 21, wherein said halogen-containing organic compound is a halogen-containing phosphate.

23. A flame retardant polyolefin resin composition as claimed in claim 19, wherein said polyester resin (G) is an aromatic or aliphatic polyester resin.

24. A flame retardant polyolefin resin composition as claimed in claim 23, wherein said aliphatic polyester resin is a lactone polymer (B).

25. A flame retardant resin molded article formed by molding the flame retardant polyolefin resin composition as claimed in any one of claims 19–24.

26. A flame retardant resin composition comprising 100 parts by weight of a thermoplastic resin (E) and 0.2–40 parts by weight of a flame retardant (F) characterized by formulating 0.5–50 parts by weight of an ester compound (H) of a polyglycerine or glycerine with a higher fatty acid based on 100 parts by weight of a flame retardant (F).

27. A flame retardant resin composition as claimed in claim 26, wherein there is formulated an additive (I) consisting of at least one inorganic compound, organic compound, or other additives for resins.

28. A flame retardant resin composition as claimed in claim 26 or 27, wherein said flame retardant (F) is at least any one kind of a bromine-based flame retardant, a chlorine-based flame retardant, a phosphorus-based flame retardant, a phosphate-based flame retardant, a polyphosphoric acid-based flame retardant, a nitrogen compound-based flame retardant, or an inorganic-based flame retardant.

29. A flame retardant resin composition as claimed in claims 26 or 27, wherein said ester compound (H) of a polyglycerine or glycerine with a higher fatty acid is at least any one of a monoglyceride, diglyceride, triglyceride, a diglycerine fatty acid ester, a triglycerine fatty acid ester, a tetraglycerine fatty acid ester, a pentaglycerine fatty acid ester, a hexaglycerine fatty acid ester, and a decaglycerine fatty acid ester.

30. A flame retardant resin composition as claimed in claim 26, wherein there is formulated an additive (I) consisting of at least one inorganic compound, organic compound, or other additives for resins.

31. A flame retardant resin composition as claimed in claim 13, wherein 17–100 parts by weight of a polyester resin (G) is formulated with 100 parts by weight of the flame retardant (F).

32. A flame retardant resin composition as claimed in claim 31, wherein said flame retardant (F) is at least any one kind of a bromine-based flame retardant, a chlorine-based flame retardant, a phosphorous-based flame retardant, a phosphate-based flame retardant, a polyphosphoric acid-based flame retardant, wherein said polyester resin (G) is a lactone polymer (B).

33. A flame retardant polyolefin resin composition as claimed in claim 19 comprising 2–10 parts by weight of a polyester resin (G) formulated with 100 parts by weight of a resin composition composed of 100 parts by weight of a polyolefin resin (P) and 3–19 parts by weight of halogen-based flame retardant (FD).

* * * * *